(12) United States Patent
Schmidt

(10) Patent No.: US 8,219,974 B2
(45) Date of Patent: Jul. 10, 2012

(54) ENFORCING LEGAL HOLDS OF HETEROGENEOUS OBJECTS FOR LITIGATION

(75) Inventor: Olaf Schmidt, Walldorf (DE)

(73) Assignee: SAP AG, Walldorf (DE)

( * ) Notice: Subject to any disclaimer, the term of this patent is extended or adjusted under 35 U.S.C. 154(b) by 1249 days.

(21) Appl. No.: 12/001,028

(22) Filed: Dec. 7, 2007

(65) Prior Publication Data

US 2009/0150866 A1    Jun. 11, 2009

(51) Int. Cl.
*G06F 9/44* (2006.01)
(52) U.S. Cl. ........................................................ 717/120
(58) Field of Classification Search .................... 717/120
See application file for complete search history.

(56) References Cited

U.S. PATENT DOCUMENTS

| | | | | |
|---|---|---|---|---|
| 6,829,333 B1* | 12/2004 | Frazier | ...................... | 379/88.17 |
| 7,802,183 B1* | 9/2010 | Essin | ............................. | 715/255 |
| 7,895,229 B1* | 2/2011 | Paknad | ........................ | 707/769 |
| 2001/0034845 A1* | 10/2001 | Brunt et al. | .................... | 713/201 |
| 2002/0083092 A1* | 6/2002 | Simpson | ...................... | 707/506 |
| 2004/0088334 A1* | 5/2004 | Klein | ............................ | 707/203 |
| 2006/0225055 A1* | 10/2006 | Tieu | ............................... | 717/141 |
| 2006/0230044 A1* | 10/2006 | Utiger | ............................. | 707/10 |
| 2008/0229037 A1* | 9/2008 | Bunte et al. | .................... | 711/162 |

OTHER PUBLICATIONS

Orchestria Legal Hold, various web pages at <www.orchestria.com>, retrieved Aug. 7, 2007, 5 pages.
Insightful Impact 2007, DMReview at <www.dmreview.com>, retrieved Aug. 8, 2007, 2 pages.
Vamosa at <www.vamosa.com>, retrieved Aug. 14, 2007, 4 pages.
e-Hold, Legal Hold Communication Management, various web pages at <www.legal-hold.com>, retrieved Aug. 7, 2007, 10 pages.
Attenex, various web pages at <www.attenex.com>, retrieved Aug. 8, 2007, 5 pages.
CaseSeeker at <www.caseseeker>, retrieved Aug. 9, 2007, 2 pages.
Sherpa Software at <www.sherpasoftware.com>, retrieved Aug. 9, 2007, 1 page.
Doculex, various web pages at <lit.doculex.com>, retrieved Aug. 9, 2007, 4 pages.
$EMC^2$ at <www.emc.com>, retrieved Aug. 8, 2007, 2 pages.
ImageMAKER Discovery Assistant, various web pages at <www.discoveryassistant.com>, retrieved Aug. 8, 2007, 3 pages.
Athena Archiver, various web pages at <www.athenaarchiver.com>, retrieved Aug. 9, 2007, 3 pages.
ByteandSwitch at <www.byteandswitch.com>, retrieved Aug. 8, 2007, 4 pages.
Xiotech at <www.xiotech.com>, retrieved Aug. 10, 2007, 1 page.
Fortiva at <www.fortiva.com>, retrieved Aug. 14, 2007, 4 pages.
Main Page at <www.edrm.net>, retrieved Aug. 7, 2007, 6 pages.
Daegis, various web pages at <www.daegis.com>, retrieved Aug. 9, 2007, 5 pages.

(Continued)

*Primary Examiner* — Wei Zhen
*Assistant Examiner* — Junchun Wu
(74) *Attorney, Agent, or Firm* — Fish & Richardson P.C.

(57) ABSTRACT

Software for managing legal holds on objects identifies a target object to associate with a particular legal hold. The example software is further operable to automatically communicate with a lookup table to verify a hold record associated with the target object. In another example, the software for managing legal holds on objects can receive a legal hold status request for a target object associated with a business application. The software can automatically communicate with a lookup table to determine a hold record identifying a legal hold associated with the target object. The software is further operable to respond to the legal hold status request with a legal hold status based on the lookup table communication.

21 Claims, 21 Drawing Sheets

OTHER PUBLICATIONS

Iron Mountain, various web pages at <www.ironmountain.com>, retrieved Aug. 8, 2007, 4 pages.

Trialgraphic, various web pages at <www.trialgraphic.com>, retrieved Aug. 9, 2007, 6 pages.

Erzine Articles at <ezinearticles.com>, retrieved Aug. 9, 2007, 4 pages.

PSS Systems, various web pages at <www.pss-systems.com>, retrieved Aug. 7, 2007, 2 pages.

Atlas LCC for Litigation at <www.lexisnexis.com>, retrieved Aug. 8, 2007, 1 page.

Commvault, various web pages at <www.commvault.com>, retrieved Aug. 8, 2007, 22 pages.

Discovery Box, various web pages at <www.discoverybox.net>, retrieved Aug. 7, 2007, 9 pages.

Netflix at <www.internetadsales.com>, retrieved Aug. 8, 2007, 5 pages.

Symantic Enterprise Vault at <www.symantec.com>, retrieved Aug. 8, 2007, 2 pages.

Exterro Fusion, various web pages at <www.exterro.com>, retrieved Aug. 7, 2007, 23 pages.

CA MDY, various web pages at <www.mdyadvtech.com>, retrieved Aug. 8, 2007, 3 pages.

Lovelock, Owen, "[*CMS-PR*] *Vamosa to Enter E-Discovery Market with 'Themis' Platform*," at <lists.cms-forum.org>, retrieved Aug. 14, 2007, 3 pages.

"*Electronic Discovery in Litigation*," EDD Supplier Landscape, Chapter IX, Conclusions, EDDix, LLC, ISSN 1551-6385, No. 1, 2004, 16 pages.

EDDix, EDD Supplier Landscape, "*Electronic Discovery in Litigation Series*", 2004, 2 pages.

EDD Supplier Profiles, "*Electronic Discovery in Litigation*", EDDix LLC, 2004, 2 pages.

Kennedy, Dennis, "*EDD Supplier Landscape, Required Reading about the Business of Electronic Discovery*," 2004, 3 pages.

Isaza, John J., "*Know When to Hold 'Em, When to Destroy 'Em*," LookSmart, 2005, 6 pages.

Fujitani, Riki, et al., "*Litigation in the Information Age: Taking Discovery into the Digital Era to Comply with New Federal E-discovery Requirements*," 2007, 6 pages.

Gruman, Galen, CIO, "*Electronic Data Discovery (EDD) Tools and Your Enterprise*," Apr. 15, 2006, 4 pages.

\* cited by examiner

| Table Name | LHM_LEGAL-HOLDS | Active |
| --- | --- | --- |
| Short Description | Table stores legal hold information | |

Attributes / Delivery and Maintenance / Fields / Entry help/check / Current/Quality Fields Search Help | Predefined Type

| Field | Key | Initi | Data element | Data Type | Length | Decim | Short Description |
| --- | --- | --- | --- | --- | --- | --- | --- |
| CLNT | | | MANDT | CLNT | 3 | 0 | Client |
| CASE GUID | | | SCMG CASE GUID | CHAR | 32 | 0 | Technical Case Key (Case GUID) |
| OBJCAT | | | LHM OBJECT | CHAR | 5 | 0 | |
| OBJKEY | | | CATEG | CHAR | 70 | 0 | Object Key |
| OBJTYPE | | | SWO TYPEID | CHAR | 10 | 0 | Object Type |
| LOGSYS | | | SWO OBJTYP | CHAR | 10 | 0 | Logical System |
| CASE TYPE | | | LOGSYS | CHAR | 4 | 0 | Case Type |
| CASE ID | | | SCMGCASE TYPE | STRING | 0 | 0 | |

FIG. 5

| Primary ID | Object Type | Dependency | Case ID |
| --- | --- | --- | --- |
| A12XY3Z456 | Business Object | ⋈ | 123 |
| 145AZ623Y1 | Specification | ⋈ | 456 |
| 333THR1106 | E-mail | | 456 |
| 621NPRCB476 | Phone log | | 789 |
| 145AZ623Y1 | Specification | | 123 |
| ... | ... | ... | ... |

FIG. 6

| Relationship Tree | Descriptn | Obj Type | Key | LogSy. | NameLogSys | Origin |
|---|---|---|---|---|---|---|
| ▽ Sales Order | 0000000064 | BUS2032 | 0000000064 | P6DC | P6DCLNT003 | Database |
| ▽ Outbound Delivery | 0000000060 | LIKP | 0000000060 | P6DC | P6DCLNT003 | Database |
| ▽ CustIndivBillingDoc | 0090000035 | VBRK | 0090000035 | P6DC | P6DCLNT003 | Not Found |
| Accounting document 0001 009 0000035 2001 | 0001 009 0000035 2001 | BKPF | 0001 009 0000000035 2001 | P6DC | P6DCLNT003 | Database |

| Relationship Tree | Descriptn |
|---|---|
| ▽ Accounting document | 0001 0090000025 2006 |
| ▽ CustIndivBillingDoc | 0090000025 |
| ▽ Returns | 0060000009 |
| ▽ Sales Order | 0000000166 |
| ▽ Returns | 0060000010 |
|     Outbound Delivery | 0084000002 |
|     CustIndivBillingDoc | 0090000026 |
|     Outbound Delivery | 0080000141 |
|     Outbound Delivery | 0084000001 |
| ▽ CustIndivBillingDoc | 0090000025 |
|     Profitab. Analysis | CustIndivBillingDoc 0090000025 |
| Profit Center Doc. | 0001 0000000829 2006A |
| Profit Analysis | CustIndivBillingDoc 0090000025 |

| Title | ASUG Lawsuit | | Status | New | |
|---|---|---|---|---|---|
| Case Type | ZLH1 | | Person Respons. | FISCHERGEO | Georg Fischer |
| Case ID | 13153 | | Created By | FISCHERGEO | Georg Fischer |
| Priority | Middle | | Created On | 17.04.2008 18:15:58 | |
| Reason | legal action | | Changed By | SCHMIDTOLAF | Dr. Olaf Schmidt |
| | | | Changed On | 11.05.2008 14:09:33 | |
| | | | Closed by | | |
| | | | Closed At | | |
| | | | Agents | | |

Linked Objects | Note | Process route | Log | Legal Hold - eDiscovery

| Hierarchy | S... | Element Type | Visibility | Last Processed | Node... | Creation (Element) |
|---|---|---|---|---|---|---|
| Linked Objects | | | | CAMPBELLH/17.04.200... | 5 | |
| Business Objects (BOR) | | | All Roles | | | |
| Accounting documents | | | All Roles | | 24 | |
| Sales Orders | | | All Roles | | 10 | |
| Customer Individual Billing Do | | | All Roles | | 27 | |
| IDOCs | | | All Roles | | 7 | |
| Purchase Orders | | | All Roles | | 15 | |
| Workflow | | | All Roles | | 18 | |
| Documents | | Documents | All Roles | | 21 | |
| Document | | | All Roles | | 22 | |
| Worklist | | | | | 1 | |

Case Search

Agents
Created On
Priority    2
Case ID
Title

Restrict Hits to    200

Case Type    ZLH1
Reason
Status

Person Respons.

Current Versions Or X

Search | Search Variants | List Location

| Case ID | Ext. ref. | Case Title | Descript. | Priority | Close Date | Agents | Responsibl | Escalation | Category | Reason | Cause Desc |
|---|---|---|---|---|---|---|---|---|---|---|---|
| 13014 | | Legal Action XYZ | | Middle | | SCHMIDTOLAF | FISCHERGEO | | | LIT2 | anticipated litigation |
| 13091 | | New Legal Hold | | Middle | | | | | | LIT1 | legal action |
| 13132 | | Georg | | Middle | | | FISCHERGEO | | | DIV | something totally different |
| 13131 | | MeinTest | | Middle | | | | | | LIT1 | legal action |
| 13151 | | Olaf | | Middle | | | FISCHERGEO | | | LIT1 | legal action |
| 13153 | | ASUG Lawsuit | | Middle | | | CAMPBELLH | | | LIT1 | legal action |
| 13156 | | ASUG Test Case | | Middle | | | CAMPBELLH | | | LIT2 | anticipated litigation |
| 13173 | | ASUG Sample Case 4 | | Middle | | | | | | LIT2 | anticipated litigation |

| | | | | |
|---|---|---|---|---|
| Title | ASUG Lawsuit | Status | New | |
| Case Type | ZLH1 | Person Respons. | FISCHERGEO | Georg Fischer |
| Case ID | 13153 | Created By | FISCHERGEO | Georg Fischer |
| Priority | Middle | Created On | 17.04.2008 18:15:58 | |
| Reason | legal action | Changed By | SCHMIDTOLAF | Dr. Olaf Schmidt |
| | | Changed On | 11.05.2008 14:09:33 | |
| | | Closed by | | |
| | | Closed At | | |
| | | Agents | | |

Linked Objects | Note | Process route | Log | Legal Hold - eDiscovery

Document Types
▷ Business Objects
  ⊕ Sales Documents
  ⊕ Purchase Orders
  ⊕ Accounting documents

FIG. 8D

| | | | | | |
|---|---|---|---|---|---|
| Title | ASUG Lawsuit | | Status | New | |
| Case Type | ZLH1 | | Person Respons. | FISCHERGEO | Georg Fischer |
| Case ID | 13153 | | Created By | FISCHERGEO | Georg Fischer |
| Priority | Middle | | Created On | 17.04.2008 18:15:58 | |
| Reason | legal action | | Changed By | SCHMIDTOLAF | Dr. Olaf Schmidt |
| | | | Changed On | 11.05.2008 14:09:33 | |
| | | | Closed by | | |
| | | | Closed At | | |
| | | | Agents | | |

Linked Objects | Note | Process route | Log | Legal Hold - eDiscovery

| Date | Time | User | Activity | Old Value | New Value | Attribute Name |
|---|---|---|---|---|---|---|
| 01.01.2008 | 17:16:16 | John Smith | Access to Case Notes | | | |
| 01.01.2008 | 17:14:41 | John Smith | Access to Linked Objects | | | |
| 01.01.2008 | 17:14:41 | John Smith | Display Case | | | |
| 01.01.2008 | 17:13:52 | John Smith | Access to Linked Objects | | | |
| 01.01.2008 | 17:13:45 | John Smith | Change Case | | | |
| 02.01.2008 | 23:12:27 | John Smith | Access to Linked Objects | | | |
| 02.01.2008 | 23:12:26 | John Smith | Change Case | | | |
| 02.01.2008 | 23:11:02 | John Smith | Access to Linked Objects | | | |
| 02.01.2008 | 23:11:00 | John Smith | Change Case | | | |
| 03.01.2008 | 14:09:17 | John Smith | Access to Linked Objects | | | |
| 03.01.2008 | 14:09:11 | John Smith | Change Case | | | |
| 04.01.2008 | 15:45:13 | John Smith | Access to Linked Objects | | | |
| 04.01.2008 | 15:45:10 | John Smith | Change Case | | | |
| 05.01.2008 | 13:18:11 | John Smith | Access to Linked Objects | | | |
| 05.01.2008 | 13:18:10 | John Smith | Change Case | | | |
| 06.01.2008 | 15:04:20 | John Smith | Access to Linked Objects | | | |
| 06.01.2008 | 15:04:19 | John Smith | Display Case | | | |
| 07.01.2008 | 15:35:17 | Peter Jhonson | Access to Linked Objects | | | |
| 07.01.2008 | 15:35:17 | Peter Jhonson | Change Case | | | |
| 07.01.2008 | 15:32:16 | Peter Jhonson | Access to Linked Objects | | | |
| 07.01.2008 | 15:32:15 | Peter Jhonson | Change Case | | | |
| 08.01.2008 | 22:44:18 | Peter Jhonson | Access to Case Notes | | | |
| 08.01.2008 | 22:44:10 | Peter Jhonson | Access to Process Route | | | |

FIG. 8E

| | FUNCTION |
|---|---|
| ☐ | ASH_AC_RELATIONS_GET |
| ☐ | ASH_LE_HU_RELATIONS_GET |
| ☐ | ASH_MM_EBAN_RELATIONS_GET |
| ☐ | ASH_MM_EKKO_RELATIONS_GET |
| ☐ | ASH_MM_MATBEL_RELATIONS_GET |
| ☐ | ASH_MM_REBEL_RELATIONS_GET |
| ☐ | ASH_PM_ORDER_RELATIONS_GET |
| ☐ | ASH_PM_QMEL_RELATIONS_GET |
| ☐ | ASH_PP_ORDER_RELATIONS_GET |
| ☐ | ASH_RL_TA_RELATIONS_GET |
| ☐ | ASH_RL_TB_RELATIONS_GET |
| ☐ | ASH_RV_LIKP_RELATIONS_GET |
| ☐ | ASH_SD_VBAK_RELATIONS_GET |
| ☐ | ASH_SD_VBKA_RELATIONS_GET |
| ☐ | ASH_SD_VTTK_RELATIONS_GET |
| ☐ | ASH_SM_QMEL_RELATIONS_GET |
| ☐ | DRB_COPA_RELATIONS_GET |
| ☐ | DRB_EC_PCA_RELATIONS_GET |
| ☐ | DRB_FEBEP_RELATIONS_GET |
| ☐ | DRB_FI_AA_NEIGHBORS_GET |
| ☐ | DRB_FI_SL_RELATIONS_GET |
| ☐ | DRB_IDOC_RELATIONS_GET_ARC |
| ☐ | DRB_SREL_NEIGHBORS_GET |
| ☐ | DRB_WORKITEM_RELATIONS_GET |

FIG. 9

ENFORCING LEGAL HOLDS OF HETEROGENEOUS OBJECTS FOR LITIGATION

TECHNICAL FIELD

This disclosure relates to computer systems and methods for case management within a business environment and, more particularly, to methods, systems, and software for creating, facilitating, managing or otherwise enforcing legal holds for business objects, documents, and other transactional data.

BACKGROUND

Rules for electronic discovery of documents in civil cases were recently implemented via substantive changes to the Federal Rules of Civil Procedures (FRCP). These changes in the FRCP help address the discovery of electronically stored information (ESI) (also known as eDiscovery), including electronic communication (e.g. e mail). The amendments were precipitated by the persistent legal arguments and tactics related to the production of ESI, such as the cost and difficulty of producing such ESI and assertions that such ESI was missing, deleted, or otherwise inaccessible. These changes generally require organizations to hold all electronic records until each legal matter is formally settled, even if an organization only reasonably anticipates litigation. Indeed, the rules require that when two companies are involved in civil litigation, they must meet within 30 days of the filing of the lawsuit to decide how to handle electronic data. The parties must agree on records to be shared and in the electronic format, as well as on a definition for accessible data. The FRCP also accelerates several timelines that have an enormous impact on eDiscovery requirements due to the volumes and complexities involved. Moreover, a lack of compliance can result in significant penalties for companies, legal experts, and executives.

Not only online (or active) data, or data used during the daily business, might be relevant for litigation. Archive files and backups can also contain a wealth of information that may be needed to satisfy audits or respond to the demands of legal discovery processes. Therefore, data which resides in archive files or on backup tapes has to be considered during the electronic discovery process in order to avoid penalties. It is important to note that archives and backups are not designed to be flexibly searched for particular information and the access to data stored in archive files or in backup stores is quite slow. In large organizations with a distributed heterogeneous system landscape caused by branch offices and/or sub-organizations in different countries, archived data and data on backup tapes is a very challenging aspect for the process of electronic discovery.

SUMMARY

This disclosure relates to creating, facilitating, managing or otherwise enforcing legal holds on objects of varying types (such transactional data, documents, archives, and source code) for use in or by litigation matters. Software for managing legal holds on objects comprises computer readable instructions embodied on tangible media and operable to identify a target object to associate with a particular legal hold. The example software is further operable to automatically communicate with a lookup table to verify a hold record associated with the target object.

In another example, the software for managing legal holds on objects can receive a legal hold status request for a target object associated with a business application. The software can automatically communicate with a lookup table to determine a hold record identifying a legal hold associated with the target object. The software is further operable to respond to the legal hold status request with a legal hold status based on the lookup table communication.

The foregoing example software—as well as other disclosed processes—may also be computer implementable methods. Moreover, some or all of these aspects may be further included in respective systems or other devices for executing, implementing, or otherwise supporting relationship management, document collection, and other case management. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 5 is an example layout of a lookup table for use by the system in FIG. 1;

FIG. 6 is another example layout of a lookup table for use by the system in FIG. 1;

FIGS. 7A-C are example representations of relationships among various entities and business objects;

FIGS. 8A-E illustrate example interfaces for managing information in a litigation setting for the case manager of FIG. 1, such as managing legal matters, viewing audit logs, and specifying selection criteria for business objects for which the relationships to other business objects are to be determined;

FIG. 9 illustrates an example application programming interface (API) set for processing business object relationships;

DETAILED DESCRIPTION

Figure 1:
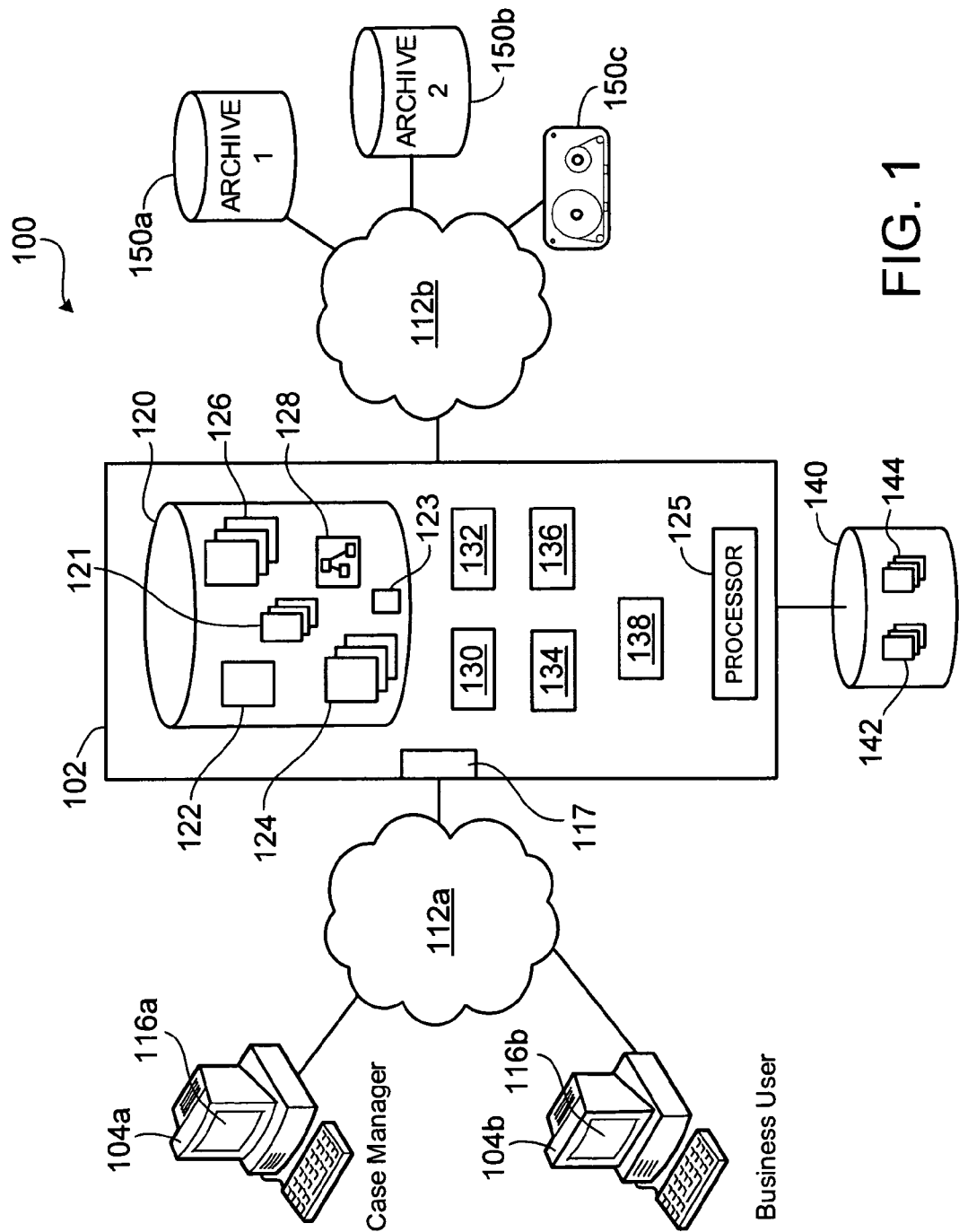
FIG. 1 illustrates an example business environment implementing various features of legal case management within the context of the present disclosure.

This disclosure relates to computer systems and methods for case management within a business environment 100 and, more particularly, to methods, systems, and software for creating, facilitating, or otherwise managing legal processes involving business objects, documents, and other (often electronic) transactional data. For example, FIG. 1 illustrates one example business environment 100 that implements a case manager 134 to help ease and automate various case management processes including managing case meta-information, document and business data collection, source code collection, email collection, document holds, and so forth. In general, this case management software 134 can offer an integrated central entry point or portal for the legal discovery process and automatically identify relevant electronic data in distributed system landscapes. More specifically, the case management software 134 could enable a user to consolidate, manage, and process information about a complex issue in a central collection point, typically at a case level. Within each case, diverse information (e.g. business objects, electronic documents, email, and so on) can be grouped, even when this information resides in different physical or logical systems. Accordingly, high level tasks of such a software solution could include:
- provide a central point for collecting electronic data related to a certain litigation, case, or other legal type matter;
- support different types of data (email, business objects, archived data, source code, etc.) across various repositories and repository types (such as different source control systems);
- support cooperative work (e.g. ad-hoc workflows);
- place or enforce a legal hold on affected electronic documents;
- provide various APIs for, among other things: i) legal hold application or enforcement to transactional and inactive data; ii) the lookup of legal hold information; iii) automatic electronic discovery; and iv) rule management;
- access management (user authorization and personalization); and
- log or audit user actions related to a certain legal hold process (such as shown in FIG. 8E).

These example features of the case manager 134 can be utilized to support a company-wide legal hold process (or perhaps even joint defense group-wide in a distributed service-oriented landscape). At a high level, a legal hold is considered a type of "freeze" placed on data objects, often because an organization wishes—or is required to—preserve certain data objects, such as transactional data (whether active or archived) and related documents, when litigation is anticipated or confirmed. Put another way, the legal hold is a process by which an organization preserves and prepares many disparate forms of electronic data and communication when litigation is anticipated or confirmed. The legal hold typically operates at the intersection of litigation and corporate retention practices. The basis of this hold is the duty against spoliation; that is, the duty to avoid the loss of, destruction of, or failure to preserve information that may be relevant to pending or potential proceedings. Thus, objects on which a legal hold has been placed would be retained (e.g. they—or instances or copies of them—cannot be destroyed) until the legal hold has been removed. For example, the case manager 134 can define a special case type "legal hold" and integrate this case type into the user-friendly case manager. The case type "legal hold" would normally be created for actual or anticipated legal actions (such as lawsuits or administrative proceedings) after a legal hold notification. In other words, an instance of this template can represent a concrete legal hold process related to specific litigation, anticipated lawsuit, or administrative/regulatory proceeding. The legal hold case helps structure a legal hold process in the context of a litigation matter and the steps involved in such a process (e.g. legal electronic discovery (or eDiscovery)).

Electronic discovery generally refers to a process in which electronic data is located, searched, and secured with the intent of using it as evidence in a lawsuit. In the process of electronic discovery, relevant data of many types can serve as evidence. This can include text, images, calendar files, databases, spreadsheets, audio files, animation and multimedia, web sites, and computer programs and their source code. In many businesses, electronic mail (e mail) can be an especially valuable source of evidence in litigation.

Environment 100 is typically a distributed client/server system that spans one or more networks, such as 112, to utilize and communicate electronic data. Put another way, environment 100 may be in a dedicated enterprise environment—across a local area network or subnet—or any other suitable environment without departing from the scope of this disclosure. In some cases, environment 100 represents an organization's accounting, payroll, inventory, development, or some other department that utilizes active or archived business transactional data, such as invoices, journal entries, human resource records, picklists, kit items, checks, and source code. It will be understood that business environment 100 encompasses any environment that includes, stores, or utilizes data—whether active or archived—that is, or could be, the target of a litigation hold or collection process. For example, the business that is associated with business environment 100 may be an enterprise, a non-profit, a home business, a data storage facility, a source code escrow company, and other appropriate entities with potentially relevant data. In fact, environment 100 can further include or be connected to other players in the electronic discovery and legal process, including law firms, experts, escrow companies, and collection companies.

Turning to the illustrated embodiment, environment 100 includes or is communicably coupled with server 102 and one or more clients 104, at least some of which communicate across network 112. Server 102 comprises an electronic computing device operable to receive, transmit, process and store data associated with environment 100. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server.

Server 102 often includes memory 120. Illustrated memory 120 represents any memory or database module and may take the form of volatile or non-volatile memory including, without limitation, magnetic media, optical media, random access memory (RAM), read-only memory (ROM), removable media, or any other suitable local or remote memory components. Illustrated memory 120 includes case metadata and template 121, lookup table 122, offline repository 123, discovery ruleset 124, profile 126, and one or more relationship graphs 128. But memory 120 may also include any other appropriate data such as HTML files, data classes or object interfaces, unillustrated software applications or sub-systems, and so on. For example, memory 120 may include pointers or other references to one or more lookup tables 122 that are located remote from server 102.

Figures 1, 3:
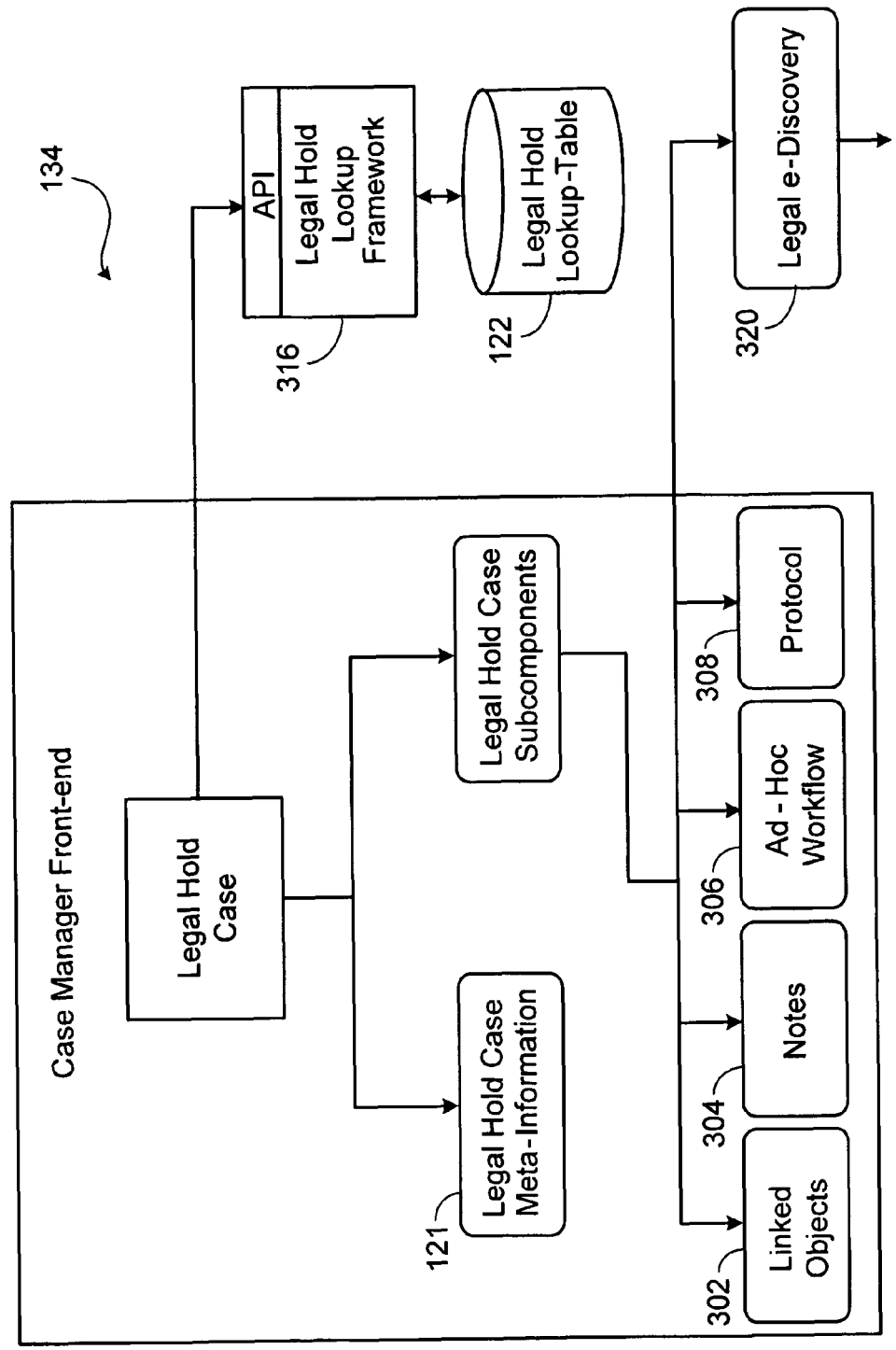
FIG. 3 illustrates one example configuration of the case manager of FIG. 1.
Figures 2, 3:
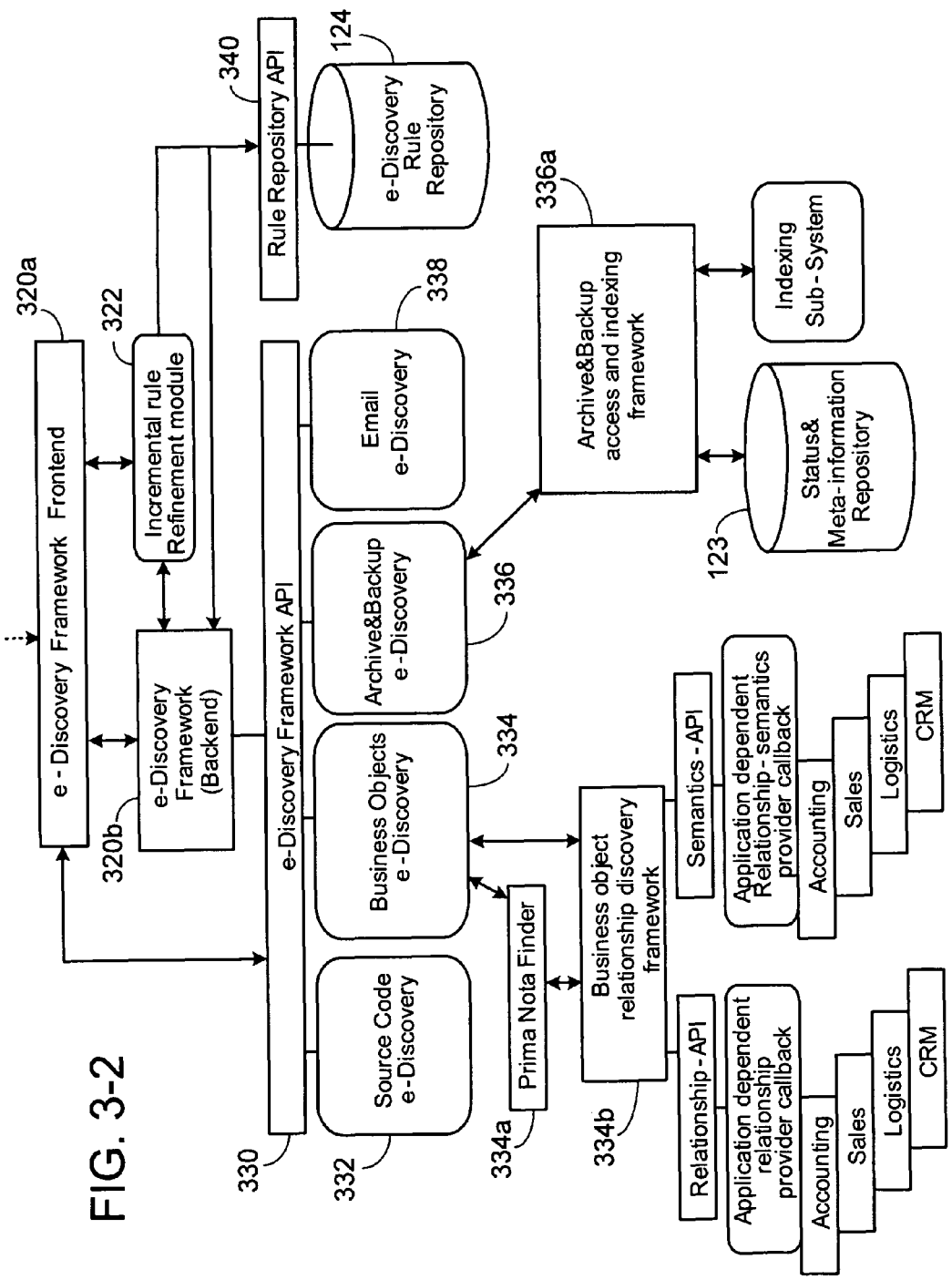

The legal hold case template 121 defines a set of meta-attributes which give detailed information about the context of a legal hold case. These attributes can be utilized for the fast lookup of legal hold cases based on meta-information search. There are two different sets of meta-attributes attached to a legal hold case. Basic meta-attributes that are inherited by legal hold cases (case ID, creation date, status, and so forth). Legal hold case specific attributes (or customer specific) can be defined when a case of a particular type (such as legal hold) is created. As shown in FIG. 3, several sub-components can be defined for a particular case and provide functionality that supports the legal hold process: Linked Objects 302, Notes 304, Ad-hoc Workflows 306, Electronic Discovery 320, and Protocol 308. Accordingly, standard sub-components can include linked objects, notes, and log components.

The linked object sub-component of the template of legal hold cases helps define anchor points for data objects of certain types which are relevant for a certain legal hold case (e.g. email, accounting documents, Word documents). In certain instances, only electronic documents of these types are relevant for a specific legal hold process in the context of a legal action, and only data objects of these types can be linked to an instance of a legal hold case. The object types can be defined based on company rules or rules defined in the litigation. In some cases, only the relevant objects are linked to a legal hold case, which helps save time during legal discovery related to a legal hold process and storage costs as well (because objects with a legal hold are not allowed to be deleted/destroyed even if retention time is expired). Notes can be entered to capture legal hold relevant information during the entire processing life of a legal hold case and to facilitate communication between processors. A log component enables a status tracking (or audit) for a legal hold case. While the audited activity can be tailored or configured, all actions related to the legal hold case can be logged in some environments. This audit information can include Who has accessed the case? What was done (view, modify, extend, etc.)? When was it? and so forth.

Legal hold (or lookup) table 122 can be considered any runtime or non-volatile data structure that allows the retrieval of a reference to an electronic document in a distributed environment based on a unique key for this document. Thus, the legal hold index can be—but is not necessarily—realized as a database lookup table. Both terms refer to electronic data of certain types used in certain contexts. One example of the layout of the legal hold (or lookup) table 122 is presented in FIG. 5, while another is presented in FIG. 6. Specifically, FIG. 5 shows a lookup table 122 with 7 fields of high level information for each record, specifically a client, a case universal identifier, an object category, an object key or identifier, an object type, a logical system, and a case type. In this example, the field OBJCAT indicates the category of the corresponding object (e.g. Business Object, email, and so on) and the field CASE ID indicates the unique identifier of a legal case that defines a legal hold for this particular object. FIG. 6 shows a second example layout that stores primary (root or source) objects, often called a prima nota. In this instance, a graph representing the object relationships (or children) is pointed to, stored, or otherwise referenced such that the size of lookup table 122 is reduced and more efficient to search. In other words, the system may determine if a particular object is subject to a legal hold by locating a legal hold record for that object's parent (or, more specifically, root) object.

Returning to FIG. 1, system 100 may include or be communicably coupled with (at some point) an offline repository 123 for status- and meta-information related to source code, archives, backup stores, and any other local or third party offline (or non-active) data in a distributed system landscape. Put another way, the offline repository can be considered a destination repository that contains information regarding relevant document repositories and the corresponding connectors to these repositories that are utilized by the electronic discovery framework (email server, external storage system for documents, content management systems, archives, backups, and so forth). Specifically, this repository can maintain, store, or reference unique identifiers for archives/backups and their locations. Meta-information about the location of an archive file, the creation date, the utilized archiving/backup system (vendor) and the record types (structure description of a date object) contained in archive files can also be maintained. In other words, while the archive or backup utility may be active, the data is generally inactive or "offline." Regardless, offline repository 123 can store information such as archive location (physical and virtual), information type(s), storage type, connector types (JDBC, API, etc.), vendor type (Oracle, Sun, etc.), online vs. offline (active server vs. tape), and so forth.

Based on this information the framework is able to locate the archive files and backup systems in the network (distributed environment). Additionally the structure of data objects which are contained in archive files and backup stores is known. When an electronic discovery is planned it can be decided which information is relevant for the lawsuit (define rules for the lookup process). This repository also stores legal hold information for archive files. As soon as the electronic discovery finds data in an archive file or backup that is relevant for an anticipated or pending litigation a legal hold flag is set. Legal holds have to be taken into account before a final delete (destroy) of data is performed. Usually a company has established some kind of policy for information retention in the context of an information lifecycle management (ILM) strategy. Thus, the framework offers an open interface for requesting legal hold information in regard to archive files and backups. This interface can be utilized by an information retention component. An example record (or other data item) could be: on fileserver <XYZ> the archive file <UVW> was produced by archive system of vendor <ABC> and this archive file contains records describing business objects of type <EFG>. No legal hold is currently defined for any data record in this archive file.

As part of (or utilized concurrently with) archive repository 123, an index can be utilized. The index for existing archives and backups can be built offline. The building process considers certain rules that describe the structure of the index and the data sources (and their locations) for the indexing process.

The rules are defined in order to support electronic discovery in the context of various lawsuits, audits, etc. and ensure that the index is filled with the appropriate data. This index can be (relatively) centralized or distributed as appropriate.

In addition to the destination repository 123, the case manager 134 can also utilize a rule/criteria repository 124 for electronic discovery. In the rule/criteria repository 124, the criteria for the identification of relevant documents are maintained. This rule repository is evaluated during the electronic discovery process. These rules are evaluated during the online and offline indexing process. Note, when the company is involved in a lawsuit there might be new rules necessary for the electronic discovery. These rules are defined and stored in a rule repository and an offline indexing process is started which takes into account all new rules. A new archive run considers all active rules and thus the relevant index data is retrieved immediately during the archiving run. A rule contains descriptions relevant information for an electronic discovery (which document types are relevant for the discovery process and which data elements are used for the lookup process). Additionally a mapping of data fields of records in archive files or backup elements to index fields in an index table is defined in these rules. An example rule or record (or other data item) could be:

In the context of a lawsuit <XYZ>, archived documents of type email and Accounting Document business objects are relevant. The electronic discovery process considers data fields <Sender>, <Send-Date>, and <Receiver> of records in the email archive. For archived accounting documents, the data fields <Company-Code>, <Fiscal Year>, and <Posting Period> of the records in the archive files are relevant. Additionally, a mapping of these data fields to the fields of the corresponding index tables can be defined.

Note, that once new rules are defined (because of a new lawsuit, audit, or other), the central index or decentralized indexes are normally updated accordingly. This is done automatically by the framework once a new rule is defined and persisted in the rule repository. Status information for each rule in the repository can indicate if the current index or indexes are updated according to this rule. As soon as the index/indexes are updated, the electronic discovery utilizes the corresponding rules.

At a high level, the profiles 126 provide a centralized repository for user-specific and role-specific personalization and authorization data in the context of legal hold management and central access mechanisms to this data for user and role maintenance. In general, personalization is the process of customizing an application or framework to the needs of specific users and groups of users, taking into account their responsibilities in the context of a certain (business) process. For example, the profiles 126 can enable the legal hold management tool provide one or more: i) interfaces for the definition of operations in the context of legal hold management and eDiscovery; ii) interfaces for the definition of business object types and the corresponding storage location (system ID, repository ID, and so forth); iii) interfaces for the mapping of system privileges and allowed operations to roles and users; iv) interfaces for maintaining new authorizations; v) interfaces to request role-based and user-based authorizations; and vi) single-sign-on mechanisms to connected systems in a distributed landscape according to personalization data.

In one implementation, there are two different levels of granularity in the context of personalization: role-level and user-level. Roles are assigned to users and have certain privileges and authorizations. During personalization, roles can be assigned to the users so that they receive authorizations to execute functions. This means that users inherit the corresponding authorizations and privileges of a role as soon as the role is assigned to the user. On the user level, personalization certain additional authorizations can be granted or revoked for certain users. Put another way, different roles for users in the context of a legal hold process can be defined. The roles might have different tasks and responsibilities during a legal hold and eDiscovery process. Defined roles can be assigned to users of the legal hold management software. The affected users 'inherit' the granted authorizations of the assigned roles. On user level, certain role-specific authorizations can be disabled or some other authorizations that are not part of a role can be added to the user-specific personalization. Personalization (whether role-based, user-based, or other) can include, among other things: i) particular access to various systems, sub-systems, or data; ii) software or functionality enablement; iii) ability to view managed documents; and iv) workflow support.

For example, case manager 134 (or profiles 126) can support personalized system/repository access in distributed system landscapes. Login information with various access privileges for relevant systems/repositories in a distributed environment for the eDiscovery is centrally maintained. During personalization, required or expected authorizations for the eDiscovery process can be mapped to roles and users. Based on this information single sign on mechanisms in the context of an eDiscovery component can be established for roles and users. Examples of such personalization include maintaining or identifying login information to the portal (or case manager 134) with i) certain privileges that could then grant access to certain types of documents available in the portal or ii) login information to certain Enterprise Resource Planning (ERP) systems that deals with certain business data (e.g. Accounting, CRM, and so forth). Additionally business object types and the corresponding system ID (location of the data) can be mapped on roles and users. Thus, case manager 134 may only execute certain processes for particular business object types in the corresponding systems as appropriate.

In another example, personalization may include enablement or disablement of certain features of the case manager 134 based on the assigned privileges. In one circumstance, eDiscovery can be enabled/disabled or eDiscovery allowed only for certain document types in certain systems. Based on the personalization for the users only the corresponding document types are visible in the eDiscovery subcomponent. The eDiscovery component of the legal hold management systems is launched for the current user. Based on the personalization data of this example user, eDiscovery may only be allowed or implemented for business object types of sales order, purchase order, and accounting documents. This personalization feature can facilitate or help different roles that are responsible for the lookup (analysis) of ERP data in different areas (e.g. Financials, Customer Relationship Management, Material Management). Users who have an assignment to these roles normally have or use certain domain knowledge. Thus, they can know how to define relevant lookup criteria for business objects that are related to a particular lawsuit (candidates for a legal hold). Another example use for this personalization feature is where not all users should have authorization to define legal holds for all types of documents (or no document at all). This can be part of the role-based personalization. There is a special role that enables the corresponding users to define or to release a legal hold for a certain document or for documents of a specific document type.

Case manager 134 may also display discovered documents based on this personalization (references are visible/invisible). The visualization of the content of a legal hold case can be controlled by the personalization as well. The linked documents of a legal hold case (documents for which legal holds are defined due to a particular lawsuit) are visible inside a legal hold case according to user personalization. In one circumstance, certain document types can be enabled/disabled in the tree view depending on the personalization data of a user. For example, accounting documents are invisible to certain users, while other users may not see references to discovered billing documents that are under a legal hold induced by the displayed legal hold case.

Workflows in the context of legal hold processes can be defined based on roles. An example for such a workflow is that there is a certain role for the lookup of financial data (e.g. accounting documents) and all related business objects. The discovered documents (references to documents) are linked to the legal hold case but the legal hold is not directly applied. There is another role for analysis of discovered documents to finally decide whether the discovered business objects are relevant for a legal hold or not (example decision criteria: Are the lookup criteria are appropriate? Are the discovered related document types relevant for a certain lawsuit?). Another role enables the corresponding users to define the legal hold. After the discovery process is finished, the legal hold case is passed to users who are assigned to the corresponding roles for further processing. At the end of the workflow a legal hold is defined for all the business objects that are still linked to the legal hold case. In some circumstances, different roles can be assigned to one user. Thus, one user can have different responsibilities in a particular workflow. In some implementations, the routing of workflow items is performed automatically according to the roles assigned to the different steps in a workflow.

Regardless of the particular use, profile 126 may allow case manager 134 to provide a richer, more secure experience to the case manager or business user. This experience can include the ability to
- Maintain authorizations for the eDiscovery process in a central repository
- Map authorizations in a distributed system environment on users and/or roles for the legal hold management software (incl. eDiscovery)
- Maintain role-based user privileges for the legal hold management framework
- Maintain role-specific display of business data (some business objects/documents are invisible for certain groups of users—not everybody should be allowed to see the payslip of the CEO).
- Maintain role specific functionality of software (e.g. some functionality is only available for specialists in a certain domain or for persons who have the appropriate legal authorization).
- Implement performance improvements when relationships between certain types of business objects are discovered due to role-specific restriction (e.g. lookup of relationships between accounting documents and sales orders rather than all relationships of accounting documents).
- Maintain role-specific workflows (no bottlenecks when several users are assigned to a certain role can allow availability check of responsible persons based on role information)

Of course, the foregoing examples are for illustration purposes and may not represent each profile 126. In other words, each rule 126 may provide none, some, or all, as well as other uses within the scope of the present disclosure. Regardless of the individual formats of each profile 126, these rules are generally operable to be selected, collected, and compiled into a logically cohesive development guideline 145.

Some or all of the guideline rules 140 and the development guidelines 145 may be stored or referenced in a local or remote development repository. For example, this repository may include parameters, pointers, variables, algorithms, instructions, rules, files, links, or other data for easily providing information associated with or to facilitate modeling of the particular object. More specifically, each repository may be formatted, stored, or defined as various data structures in HTML, PHP (PHP: Hypertext Preprocessor), eXtensible Markup Language (XML) documents, text files, Virtual Storage Access Method (VSAM) files, flat files, Btrieve files, comma-separated-value (CSV) files, internal variables, one or more libraries, or any other format capable of storing or presenting the objects and their respective methods in a hierarchical form, such as a tree with multiple nodes. In short, each repository may comprise one table or file or a plurality of tables or files stored on one computer or across a plurality of computers in any appropriate format as described above. Indeed, some or all of the particular repository may be local or remote without departing from the scope of this disclosure and store any type of appropriate data.

Memory 120 may include, reference, or be coupled with online repository (termed database for simplicity) 140, which generally represents any online data repository that stores or references active transactional or other business data. Put another way, database 140 stores information created, used, or otherwise managed in a business environment or by a business application in various different forms and structures. Such information may include structured data or data objects 142, such as business objects or business process objects. Information created and stored in the business environment or by a business enterprise may also exist in an unstructured format 144. Such unstructured data may be created, stored, managed, and accessed outside of the business application, yet remain pertinent to the user of the application, as well as the business enterprise as a whole. Further, this unstructured data may be logically related to the structured data managed and stored by the business application. But an association of such unstructured data with the structured data may be difficult, in part, due to the structured environment of the business application.

In some cases, database 140 includes a database management system and an accessible document repository. Generally, illustrated database system 200 is meant to represent a local or distributed database, warehouse, or other information repository that includes or utilizes various components. The database management system is typically software that manages online data repository 145, performs tasks associated with database management, and/or responds to queries, including storing information in memory 120, searching online data repository 140, generating responses to queries using information in online data repository 140, and numerous other related tasks. For example, database management system 108 may be any database management software such as, for example, a relational database management system, a database management system using flat files or CSV files, an Oracle® database, a structured query language (SQL) database, and the like.

In one embodiment, the structured transactional data may comprise business objects 142 resident in a service-oriented architecture. At a high level, the business object 142 is a capsule with an internal hierarchical structure, behavior offered by its operations, and integrity constraints. Business objects 142 are semantically disjointed, i.e., the same business information is represented once. The business object model contains all of the elements in the messages, user interfaces, and engines for these business transactions. Each message represents a business document with structured information. The user interfaces represent the information that the users deal with, such as analytics, reporting, maintaining, or controlling. The engines provide services concerning a specific topic, such as pricing or tax. Semantically related business objects may be grouped into process components that realize a certain business process. The process component exposes its functionality via enterprise services. Process components are part of the business process platform. Defined groups of process components can be deployed individually, where each of these groups is often termed a deployment unit.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view of some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term "business object" will be used generically to refer to a business process object and a master data object, unless the context indicates otherwise. As usually implemented, business objects are free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and, as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately callable function, described by a set of data types used as input, output, and fault parameters serving as a signature.

The architectural elements may also include the service interface, referred to simply as the interface. The interface is a named group of operations. The interface often belongs to one process component and that process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create," "update," or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

Systems and methods may include business interfaces (or other modules or software) to perform various operations such as accessing, processing, and/or modifying data stored, processed, or otherwise represented by graphs. The underlying structure of a data model is termed the data model hierarchy and often takes the form of an oriented acyclic graph. Data models and entity types can be used in several data models. The data model hierarchy can provide a fast process of obtaining an overview of the structure of a data model and the entity types and sub-models participating in it. Specifically, this data model can comprise entity types, relationship categories, and specialization categories. Each entity can be considered a physical or abstract object (for example, Mr. Douglas or the "Sales Information System" project) that can be distinguished from other objects and for which information is to be stored. Semantically-related objects are combined to form their own data model. Complex models are split into smaller sub-models that can themselves also be structured. These data models may utilize any particular data structures or elements, such as business objects.

Figure 4:
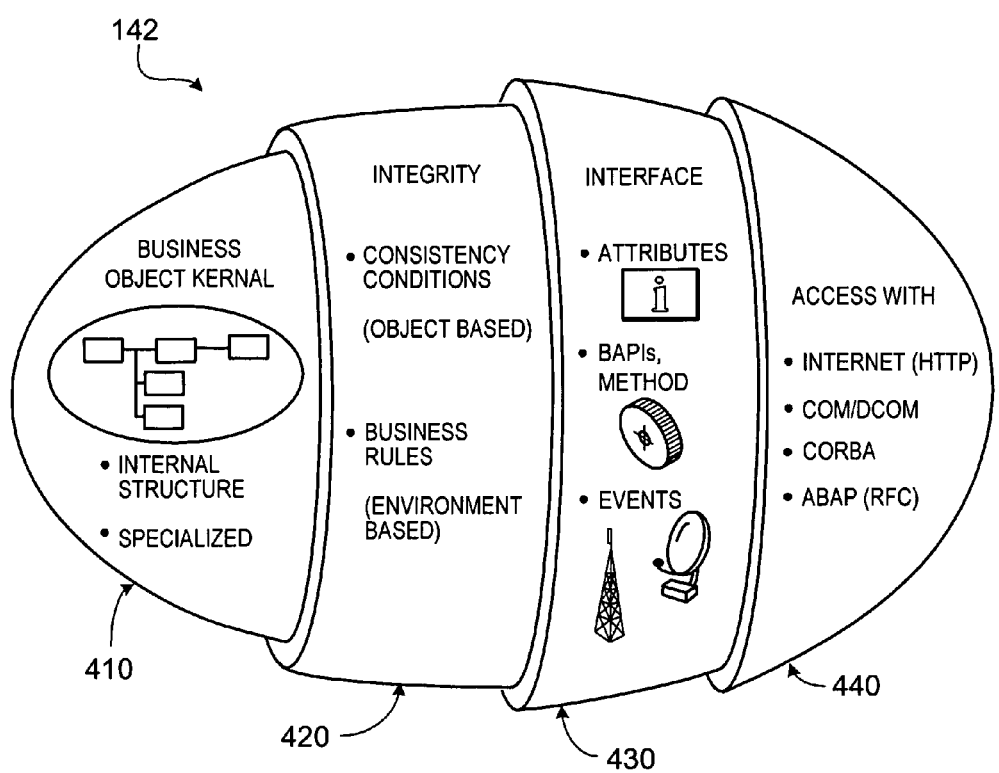
FIG. 4 is a diagram of a generic business object in a particular implementation of FIG. 1.

A business object is a capsule with an internal hierarchical structure, behavior offered by its operations, and integrity constraints. Business objects are semantically disjointed, i.e., the same business information is represented once. A business object may be defined such that it contains multiple layers, such as in the example business object 142, which is graphically represented in FIG. 4. More specifically, FIG. 4 illustrates the structure of a business object 142 in environment 100. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

The innermost layer of the example business object is the kernel layer 410. The kernel layer 410 represents the business object's 142 inherent data, containing various attributes of the defined business object. Inherent data may include, for example, an employee's name, age, status, position, address, etc. The second layer represents the integrity layer 420. In the example business object 142, the integrity layer 420 contains the business logic of the object. Such logic may include business rules for consistent embedding in the environment 100 and the constraints regarding the values and domains that apply to the business object 142. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object 142a. The third layer, the interface layer 430, may supply the valid options for accessing the business object 142 and describe the implementation, structure, and interface of the business object to the outside world. To do so, the interface layer 430 may contain methods, input event controls, and output events. The fourth and outermost layer of the business object 142 in FIG. 4 is the access layer 440. The access layer 440 defines the technologies that may be used for external access to the business object's 142 data. Some examples of such technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 142a of this embodiment may implement standard object-oriented technologies such as encapsulation, inheritance, and/or polymorphism.

Accordingly, the third layer 430 separates the inherent data of the first layer 410 and the technologies used to access the inherent data. As a result of the described structure, the business object reveals only an interface that includes a set of clearly defined methods. Thus, applications typically access the business object via those defined methods. An application wanting access to the business object and the data associated therewith must include the information or data required to execute the clearly defined methods of the business object's interface. The clearly defined methods of the business object's interface represent the business object's behavior. That is, when the methods are executed, the methods may change the business object's data. Therefore, an application may utilize any business object by providing the required information or data without having any concern for the details related to the internal operation of the business object.

Conversely, unstructured data 144 can be considered "active" information that is not currently associated with a specific structure within the particular portion of business application 130. More specifically, system 100 often includes (or otherwise references) unstructured data 144 that can include flat files, attachments, faxes, spreadsheets, graphical elements, design drawings, slide presentations, text documents, mail messages, webpages, source code, or other files. In particular, structured data can be considered unstructured data 144 if it is analyzed without its metadata or outside the context of the particular application, database, or process. For example, an application can generate an unstructured element based on structured data. In another example, a database can export or archive more structured database records into unstructured data elements 144. Moreover, an active process may not recognize the structure of an unrelated (or unknown) structured element 142 and process it as an unstructured element 144.

Returning to the overall example system, illustrated server 102 includes one or more processors 125. The processor 125 may be a central processing unit (CPU), a blade, an application specific integrated circuit (ASIC), or a field-programmable gate array (FPGA). The processor 125 may execute instructions and manipulate data to perform the operations of server 102. Although FIG. 1 illustrates one processor 125 in server 102, only one or more than one processor may be used according to particular needs or desires of environment 100. In the illustrated embodiment, processor 125 executes or interfaces with executing development tool (or environment) 130, business application 132, case manager 134, information retention manager (IRM) 136, and email server 138.

Various portions of case manager 134 may offer interfaces (or APIs) for use by the use of the development environment 130. Generally, the development environment 130 may be any development tool, toolkit, application, or other framework that allows a developer to develop, configure, and utilize data and software objects to develop software solutions or portions thereof. For example, the designer or developer may utilize an integrated development environment (IDE), which is computer software that enables computer programmers to develop other software, such as ABAP and others. The IDE typically includes a source code editor, a compiler, an interpreter, build-automation tools, and a debugger. IDEs that are used for developing object-oriented software may also include a class browser, an object inspector, and a class hierarchy diagram. Within such an IDE, the application can often be developed using modeling systems. In general, these models can specify the types of development objects or components that can be used to build applications, as well as the relationships that can be used to connect those components. More specifically, this model-driven framework or environment may allow the developer to use simple drag-and-drop techniques to develop pattern-based or freestyle user interfaces and define the flow of data between them, including deeper hierarchical data. Such drag-and-drop techniques may include selecting, inputting, identifying, or some other indication that the developer is interested in a particular object or element. The result could be an efficient, customized, visually rich online experience. In some cases, this model-driven development may accelerate the application development process and foster business user self-service. It further enables business analysts or IT developers to compose visually rich applications that use analytic services, enterprise services, remote function calls (RFCs), APIs, and stored procedures. In other cases, the development environment 130 may be a workbench or other studio product that allows the developer to graphically or manually code portions of an enterprise software solution within environment 100.

At a high level, business application 132 is any application, program, module, process, or other software that may execute, change, delete, generate, or otherwise manage business information according to the present disclosure. In certain cases, environment 100 may implement a composite application 132. For example, portions of the composite application may be implemented as Enterprise Java Beans (EJBs) or design-time components, and may have the ability to generate run-time implementations in different platforms, such as J2EE (Java 2 Platform, Enterprise Edition), ABAP (Advanced Business Application Programming) objects, Service Oriented Architecture (SOA), or some other platform.

Further, while illustrated as internal to server 102, one or more processes associated with business application 132 may be stored, referenced, or executed remotely. For example, a portion of application 132 may be a web service that is remotely called, while another portion of application 132 may be an interface object bundled for processing at remote client 104. Moreover, application 132 may be a child or sub-module of another software module or enterprise application (not illustrated) without departing from the scope of this disclosure. Additionally, in some instances, application 132 may be a hosted solution that allows multiple parties in different portions of the process to perform the respective processing. For example, client 104 may access business application 132 on server 160, or even as a hosted application located over network 120, without departing from the scope of this disclosure. In another example, portions of business application 132 may be used by an authorized user working directly at server 160, as well as remotely at client 104. In yet another example, business application 132 may be hosted by a third party entity for use by a remote client 104 authorized by the taxpaying entity. Regardless of the particular implementation, "software" may include software, firmware, wired or programmed hardware, or any combination thereof as appropriate. Indeed, each software component may be fully or partially written or described in any appropriate computer language including C, C++, Java, Visual Basic, assembler, Perl, any suitable version of 4 GL, as well as others.

More specifically, business application 132 may be a composite application, or an application built on other applications, that includes an object access layer (OAL) and a service layer. In this example, business application 132 may execute or provide a number of application services such as customer relationship management (CRM) systems, human resources management (HRM) systems, financial management (FM) systems, project management (PM) systems, knowledge management (KM) systems, and electronic file and mail systems. Such an OAL is operable to exchange data with a plurality of enterprise-based systems and to present the data to a composite application through a uniform interface. The example service layer is operable to provide services to the composite application. These layers may help composite application 132 to orchestrate a business process in synchronization with other existing processes (e.g., native processes of enterprise-based systems) and leverage existing investments in the IT platform. Further, composite application 132 may run on a heterogeneous IT platform. In doing so, composite application 132 may be cross-functional in that it may drive business processes across different applications, technologies, and organizations. Accordingly, composite application 132 may drive end-to-end business processes across heterogeneous systems or sub-systems. Application 132 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 132, it may instead be a standalone or (relatively) simple software program. Regardless, application 132 may also perform processing automatically, which may indicate that the appropriate processing is substantially performed by at least one component of environment 100. It should be understood that this disclosure further contemplates any suitable administrator or other user interaction with application 132 or other components of environment 100 without departing from its original scope.

Information retention manager 136 generally encompasses software that implements one or more document or information retention policies. For example, an information retention management application 136 may include an Archive Session Manager ("ASM"), an interface to case manager 134, a Destruction Manager ("DM"), an Information Retention Manager ("IRM"), and an Information Retention Executioner ("IRE"). According to one implementation, the DM communicates with the IRE to cause one or more business objects 142 and any associated attachments 144 to be destroyed, such as at the conclusion of the retention period. The IRM may initiate archiving by, for example, executing one or more retention time rules to identify one or more business objects according, for example, to properties of the business objects. IRE executes retention properties associated with the business objects 142 as a result of the execution of the retention time rules. The IRE may also function to transfer business objects identified by the IRM from a primary system to a long-term storage system as described herein. Case manager 134 can communicate with the IRE to help ensure a hold, such as the legal hold described herein, to one or more business objects 142 and any associated attachments 144. The ASM can be used to call the IRM to initiate the archiving process. The archiving process may begin when the business objects 142 are queried and one or more of the business objects 142 are identified and assigned an expiration date. The business objects may be queried and an expiration date assigned based on one or more retention time rules defined by a user or according to a default set of retention time rules.

Regardless of the particular implementation or application, "software" encompasses software, firmware, wired or programmed hardware, or any combination thereof to be computer readable instructions as appropriate. Indeed, each software component may be fully or partially written or described in any appropriate computer language including C, C++, Java, Visual Basic, assembler, Perl, any suitable version of 4 GL, as well as others. It will be understood that while the software illustrated in FIG. 1 is shown as a single module that implements the various features and functionality through various objects, methods, or other processes, the software may instead include a number of sub-modules, third party services, components, libraries, and such as appropriate. Conversely, the features and functionality of various components can be combined into single components as appropriate.

Server 102 may also include interface 117 for communicating with other computer systems, such as clients 104, over network 112 in a client-server or other distributed environment. In certain embodiments, server 102 receives data from internal or external senders through interface 117 for storage in memory 120 and/or processing by to processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals. Interface 117 may allow communications across network 112 via a virtual private network (VPN), SSH (Secure Shell) tunnel, or other secure network connection.

The network 112 facilitates wireless and/or wireline communication between the server 102 and any other local or remote computer, such as the clients 104. Indeed, while illustrated as two networks, 112a and 112b respectively, network 112 may be a continuous network without departing from the scope of this disclosure, so long as at least a portion of network 112 may facilitate communications between senders and recipients of requests and results. The network 112 may be all or a portion of an enterprise or secured network. In another example, a portion of network 112 may be a virtual private network (VPN) merely between the server 102 and the client 104 across wireline or wireless link. Such an example wireless link may be via 802.11a, 802.11b, 802.11g, 802.20, WiMax, and many others. In another example, network 112a may represent part of an intranet, while network 112b may represent part of the intranet and part of the internet. In other words, the network 112 encompasses any internal or external network, networks, sub-network, or combination thereof (whether physical or logical) operable to facilitate communications between various computing components in the system. The network 112 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, the network 112 may be a secure network associated with the enterprise and certain local or remote archives, source code repositories, databases, or clients.

For example, FIG. 1 illustrates three offline storage media or archives 150. Offline storage media 150 may take the form of an optical storage device, such as a CD-ROM or DVD, or may be a tape or other magnetic storage device, or any other appropriate device for the storage of electronic data. Although illustrated in FIG. 1 as separate from server 102 and communicably coupled through an interface, offline storage media 150 may, in some cases, reside on server 102 or be communicably coupled to server 102. In fact, in some cases, offline storage media 150 may be integral to server 102. For example, first archive 150a may represent a local archive that stores inactive or unstructured data. This local archive may include a document repository, fast search index, and other information storage solutions. The second archive 150b may represent a third party solution, whether onsite or not, that stores certain archived or backup data. The final example, archive 150c, can represent a backup tape or other portable media.

Client 104 is any computing device operable to connect or communicate with server 102 or network 112 using any communication link. At a high level, each client 104 can include or execute GUI 116 and comprises an electronic computing device operable to receive, transmit, process and store any appropriate data associated with environment 100, typically via one or more applications such as case manager 134, development environment 130, or business application 132. It will be understood that there may be any number of clients 104 communicably coupled to server 102. Further, "client 104," "manager," and "user" may be used interchangeably as appropriate without departing from the scope of this disclosure. Moreover, for ease of illustration, each client 104 is described in terms of being used by one user. For example, the respective client 104 could be used by an in-house lawyer, remote outside counsel, paralegals, case managers, business users, and so forth. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely, the client portion of GUI or application interface 136.

GUI 116 comprises a graphical user interface operable to allow the user of client 104 to interface with at least a portion of environment 100 for any suitable purpose, such as viewing application, modeling, or hierarchical data. Generally, GUI 116 provides the particular user with an efficient and user-friendly presentation of data provided by or communicated within environment 100. More specifically, GUI 116 can be the front-end of case manager 134 or include various interfaces representing such management. For example, GUI 116 may provide an interface for updating the status information in the central status repository. In another example, GUI 116 may present an interface for inserting new rules or updating existing rules in the rule repository and requesting rules from the rule repository. In yet another example, GUI 116 may present a query interface for the electronic discovery process in archives and backup stores. This can be a generic user interface as well as a software interface that can be used by third-party applications to utilize the query functionality of the framework. In this example, GUI 116 may further implement a search infrastructure that executes sub-queries for each of the created indexes in parallel.

In some cases, GUI 116 may comprise a web browser that includes a plurality of customizable frames or views having interactive fields, pull-down lists, and buttons operated by the user. For example, GUI 116 is operable to display certain presentation elements, such as wiki pages and links, in a user-friendly form based on what the user, or developer, is trying to accomplish. GUI 116 may also present a plurality of portals or dashboards. For example, GUI 116 may display a portal that allows developers or information managers to view, create, and manage guideline rules 140. GUI 116 is often configurable, supporting a combination of tables and graphs (bar, line, pie, status dials, etc.) and is able to build real-time dashboards. It should be understood that the term "graphical user interface" may be used in the singular or in the plural to describe one or more graphical user interfaces and each of the displays of a particular graphical user interface. Indeed, reference to GUI 116 may indicate a reference to the front-end or a component of any application or software, as well as the particular interface accessible via client 104, as appropriate, without departing from the scope of this disclosure. Therefore, GUI 116 contemplates any graphical user interface, such as a generic web browser or touchscreen, that processes information in environment 100 and efficiently presents the results to the user. Server 102 can accept data from client 104 via the web browser (e.g., Microsoft Internet Explorer or Mozilla Firefox) and return the appropriate HTML or XML responses to the browser using network 112.

Figure 2:
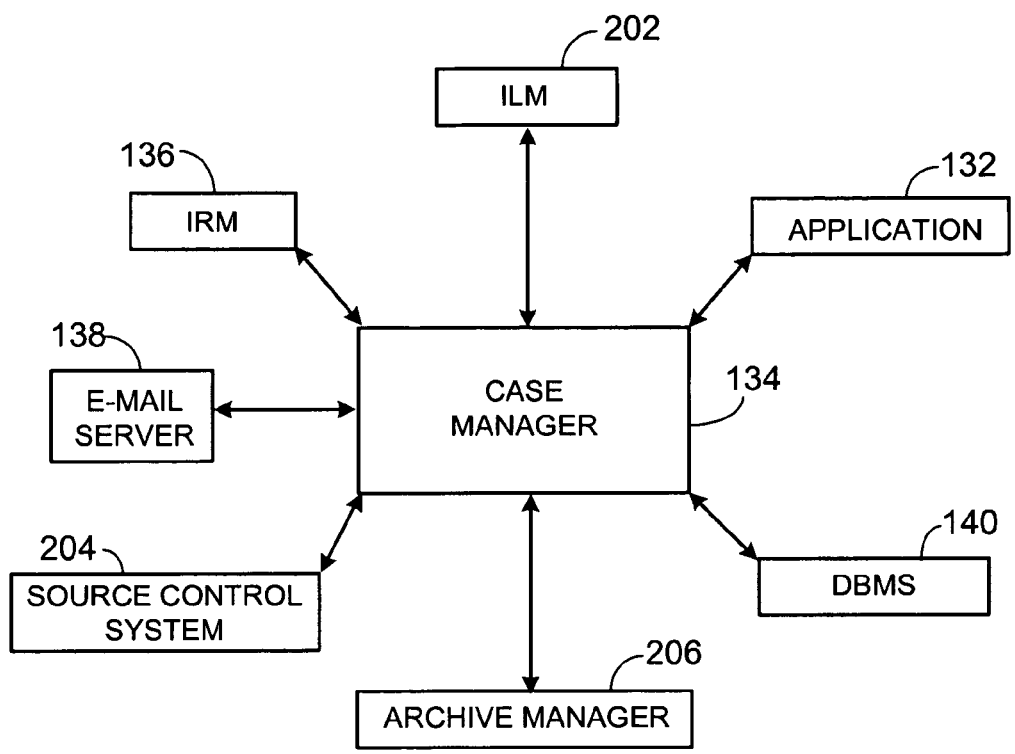
FIG. 2 illustrates example interfaces between the case manager of FIG. 1 and other local or remote software modules and applications.

FIG. 2 illustrates example interfaces between the case manager 134 and other local or remote software modules and applications to identify, collect, enforce or confirm legal holds on, or otherwise manage or facilitate management of active and inactive data in terms of a litigation matter, audit, or other case within the context of this disclosure. Specifically, in this example, case manager 134 communicates (via APIs, interfaces or user exits, services, messages, or other communication channels) with business application 132, database management system (or active data repository) 140, one or more backup or archival systems 206, one or more source control systems 204 such as Concurrent Versions System (CVS), an email server 138, an information retention manager 136, and/or a generic (or third party) information lifecycle management system 202.

Figure 8C:
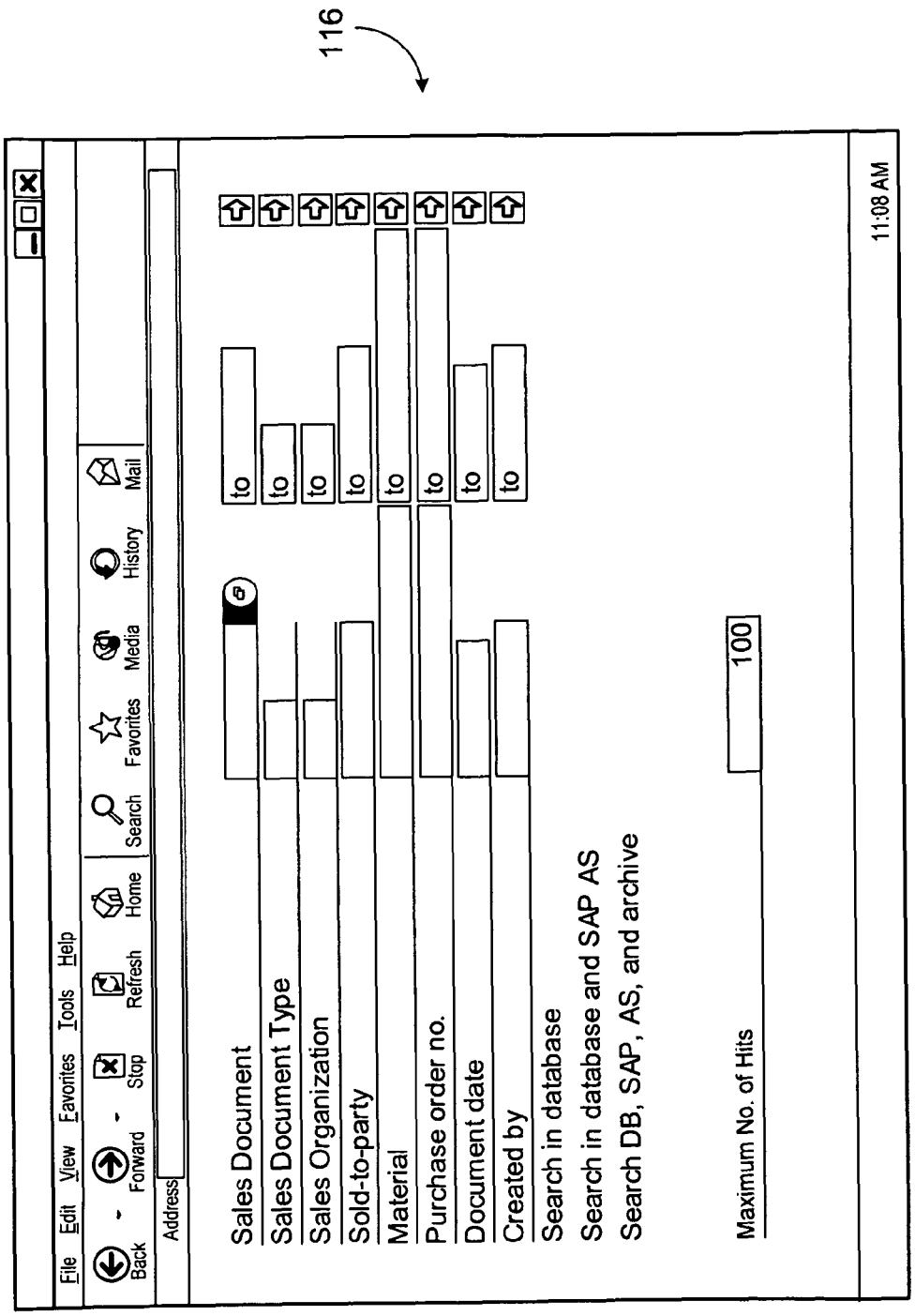

Regardless FIG. 3 illustrates one example configuration of the case manager 134. It will be understood that while this software is shown as multiple modules that implement the various features and functionality through various objects, methods, or other processes, the features and functionality of various components can be combined into single components as appropriate. Moreover, other local or remote modules or processes could be used alternatively or as a complement to the illustrated configuration. Indeed, in various situations, one or more of the example modules or frameworks may exist alone. For example, a certain system may implement the legal hold functionality without implementing the source code processing. In another example, a system may implement or utilize the object relationship framework to automatically determine relationships between heterogeneous objects (perhaps cross-application or cross-system) outside the litigation or legal hold context. That aside, the illustrated case manager 134 allows the case manager or other user to create or search for a case (or litigation matter), perhaps using a litigation template, using GUI 116 such as illustrated in FIGS. 8A and 8B. In various circumstances, this case instance drives the remaining functionality. For example, the case meta-information and it sub-components could be used to determine which sub-modules and processes to execute. Moreover, this information could be used to select (or exclude) particular data, data types, systems, and users. Further, the user could request execution of specific sub-modules through the front-end such as business objects relationships (FIG. 8C) and eDiscovery generally (FIG. 8D).

The legal hold lookup framework 316 manages legal hold indexes for legal hold information related to electronic documents or business objects stored in a distributed system landscape of a large organization. The framework 316 is able to handle many types of electronic data due to an infrastructure of open interfaces which support the integration of new document types and business objects. In some circumstances, electronic documents or business objects are identified by unique keys of different formats (the structure of unique keys for documents in the repository of a CMS is different from the structure of a unique key of an accounting document in an ERP-system). Thus, the legal hold lookup framework 316 normally offers mechanisms to handle unique keys of different structures. Generally, there are two general mechanisms: a decentralized approach and a more centralized approach.

In the decentralized approach, different legal hold indexes are used for different document/object types. Thus, specific legal hold indexes are accessed via unique keys with different key structures. For this reason—in addition to the legal hold indexes—the corresponding access methods to the different legal hold indexes are registered with the legal hold lookup framework. Conversely, the more centralized approach uses one logically centralized lookup index, which may be physically located in various places, rather than different document type specific indexes. In this case, the lookup framework utilizes a multidimensional hashing algorithm to calculate hash keys for the unique keys of documents/objects with different types. A tuple (document type/hash key) is used for the insertion and lookup of legal hold information related to a certain document in the centralized lookup index. The legal hold check has to resolve conflicts induced by hash key collisions in the very unlikely case that document/object keys of different document/object types are mapped to the same hash key. The main advantage of this approach is that the lookup framework generically supports document keys of various structures without the need for document type specific access methods to different lookup indexes which are registered in the framework 316. Due to the calculation time for hash keys, the performance of this more centralized approach (insert and lookup) might be lower than the performance of the distributed approach.

In certain implementations, the legal hold lookup framework 316 offers various APIs to other applications/services to determine if the particular business object or other data object is subject to a legal hold. Slightly modified versions of the other example APIs can be use in (or by) the centralized approach and the distributed approach. Such example APIs may be operable to connect to lookup table 122, determine if object is subject to hold (check), set legal hold, case information requests, release legal hold/delete from lookup table 122, and object type integration API. For example, the framework may include an object type integration API supports the integration of new document types. Methods are provided that can be utilized to integrate a new document type specific lookup index and the corresponding access methods to this index into the framework. The legal hold lookup framework has a repository which links document types to the corresponding registered lookup indexes. The object type integration API allows an easy extension of the framework without modifying existing code of applications/legal hold management software in order to have legal hold support for a new document type.

In another example, the framework 316 may include a legal hold definition API which is utilized to define a legal hold for an electronic document/object. Based of the document/object type of the specified document/object the legal hold lookup framework identifies the corresponding lookup index for this type and maps the input parameters to the parameters of the registered access methods for this lookup index. The access methods are used by the framework to insert a reference to the electronic document into the appropriate lookup index.

Method SET_LEGAL_HOLD

Input: Unique Object ID; Object Type; Storage Location (logical system ID)

In yet another example, the legal hold framework 316 may include a legal hold check API that checks if a certain electronic document specified by a unique object key is put under legal hold. The legal hold lookup framework 316 identifies the corresponding registered type specific (business object, email, document stored in CMS, and so on), lookup index, and access methods or uses central lookup index as appropriate. In some cases, a certain document/object is linked to several legal hold processes. In these situations, the object is generally considered under a legal hold as long as there is at least one active legal hold process which refers to this object.

Method CHECK_LEGAL_HOLD

Input: Unique Object ID; Object Type

Output: List of Case IDs

Another example API, the information request API, generally involves the retrieval of background information related to a certain legal hold (report list of electronic documents related to a certain legal hold process; report list of repositories where electronic documents under a legal hold are stored; etc).

These APIs, as well as others, can be integrated into case manager 134. Once relevant electronic documents are identified by a legal discovery process (e.g. automatic electronic discovery solution) and linked to a legal hold case the corresponding information is inserted into the corresponding lookup index. The APIs can be utilized by all kinds on applications in order to request information in regard to a legal hold. An important example for such an application is a retention management software module. In the context of automatic retention management, the legal hold lookup framework 316 can be utilized in order to identify if a scheduled destruction job of electronic data due to a defined retention policy would affect data placed under a legal hold. In this case the destruction must be prevented by retention management software. Example scenarios of how this can be integrated into the retention management solution include:

1) retention management solution checks defined retention rules and determines a list of electronic documents for which the retention time has expired. These objects are candidates for a destruction operation.

2) use the legal hold lookup framework 316 to check for each identified electronic document/object whether it has been put under legal hold or not. Remove the corresponding documents from the destruction list.

3) execute the destruction job for all remaining documents on the destruction list.

Apart from retention management, the lookup framework 316 can be integrated into other kinds of software system which deals with electronic data. On the one hand it would be possible to define a legal hold for a certain electronic document from inside an application (e.g. email client or server). For example, users are able to define legal hold properties for a certain emails. The insert interface of the legal hold framework is called by the email client or email server in order to identify the corresponding lookup index for emails and the unique references to the emails are inserted into the determined index). On the other hand, the particular application can call the legal hold framework 316 before a delete request for a certain document is processed (e.g. email client or server). For example, if the user wants to delete a certain email, the check legal hold interface of the legal hold framework 316 can be called in order to verify whether the email is under legal hold or not). This example email can then be deleted when the legal hold framework no longer indicates a legal hold for the email.

In addition to this example core functionality, the framework 316 may offer a registration mechanism for software modules and hardware components like storage systems. Once legal hold information is updated, registered components are notified and the components can react accordingly. For instance, a registered storage system can start a mass destruction process after a legal hold is released for a larger number of documents stored in this repository.

The electronic discovery module 320 can be tightly integrated as a subcomponent into a case manager 134. In certain implementations, the eDiscovery module 320 primarily includes two parts, the visual UI 320a and a connector to a generic eDiscovery framework 320b, which can offer an API set 330. The visual UI supports the configuration of a litigation specific eDiscovery process by selecting certain document types from list of all supported document types. The selected document types are presented in a visual subcomponent of the legal hold case in an appropriate way (e.g. tree view). By a double-click on a presented document type or via a context menu, a document type specific UI can be launched that enables the user to define more detailed criteria for the discovery process in addition to case specific rules and to launch the discovery process or to define a starting time. By doing this, a discovery process that is directly related to a certain litigation represented by a legal hold case can be defined and executed. The definition of a case-specific discovery process includes the definition of document types and document locations as well as the definition of characteristic/ properties for relevant electronic documents in the context of the corresponding litigation.

In certain implementations, the electronic discovery module 320 may include various sub-modules or process such as source code eDiscovery 332, business object eDiscovery 334, archive eDiscovery 336, and email eDiscovery. Generally, source code eDiscovery 332 is a central access point to a plurality of source repositories/control systems 204. To help accomplish this, source code eDiscovery 332 may include the connectors to the disparate systems, as well as a parser to allow for easier searching. This module can be capable of searching according to versions, dates, key words, modules, and any other suitable criteria. Once located, source code eDiscovery 332 may hold specific versions of source code that require the developers to start development in new version. Source code eDiscovery 332 can also search and hold related source control system comments as appropriate.

The eDiscovery framework 330 also typically includes or executes a business object eDiscovery module 334. Generally, this module is responsible for identifying or collecting the various structured data, such as business objects 142. Often, this functionality utilizes rules 124 (criteria) for discovery of the business objects 142. These criteria describe business objects 142 that are or might be relevant for a legal hold or document collection in the context of an actual or an anticipated litigation. The rules or criteria can be defined according to company-wide guidelines or special guidelines for specific types of lawsuits related to certain topics (such as tax laws, intellectual properties, and so on). More specifically, this module a) supports the process finding related business objects in a generic and automated way, b) help manage legal hold information for this structured data, and c) provides an API for requesting legal hold information related to certain business objects.

To this end, the business object eDiscovery module 334 may also include a prima nota finder 334a to more easily identify a "root" or source business object (or other active data element) and a business object framework 334b that creates a graphical representation of relations between various types of business objects in an ERP landscape. Specifically, this framework 334b, perhaps using a simple callback function, creates a graph taking a target business object as the root node, then the branches to the related business objects. The framework 334b determines directly linked objects for each of these initial objects and so on. This is generally a recursive process that is continued until no new object (and thus no new relation) can be added to the set of discovered business objects. Cycles can be automatically detected during the discovery process. The graph can span system boundaries (and vendor software). This graph is typically instance-based (i.e. a specific instance of data, one PO or one vendor location) and not generic. In some cases, the framework may also generate a graph data structure (set of nodes, set of edges that connects nodes) from the discovered information. If desired, the calculated information about the discovered document relations can then be persisted graph repository 128 for later offline processing. In some instances, the framework may ignore the technical business objects (business objects that are only used within the system) for simplicity and to keep graph from becoming too complex. This framework often includes visualization of the graphs and filter criteria (by business object type (employee listed on the PO), business logic type (accounting), etc.). Indeed, the framework may offer easy drill-down into specific nodes such that the user can expand the node.

For example, the framework 334b can determine relations between existing documents and the corresponding semantic, as well as the direction, of the relation in a business process. Starting with an initial object, this relationship framework ascertains those objects linked directly with this object. Generally, 'linked directly' would be defined by functions provided by relevant application, such as business application 130. These functions can be integrated into the framework by the use of open interfaces. Indeed, the open architecture of the framework and the provided interfaces allow an easy extension of the discovery process in order to support additional (new) types of business objects and relations.

These relations between different (perhaps business) objects are often not modeled in relational databases. Thus complex queries that include different object types may not be realizable (or easily realizable) with conventional query techniques. But by utilizing this object relationship functionality, the framework may facilitate complex queries that realize joins between different object types across system borders in a distributed environment, often without application knowledge. In this instance, the framework may further comprise components such as a user interface that enables users to interactively configure complex queries (or a more automatic software interface), a provider mechanism to request business object attribute information for the corresponding business objects based on the business object model, a connected indexing subsystem for storing the retrieved business object attributes (the indices can map business object attribute values to the graphs containing the corresponding business objects), and a persistence layer to store configured query descriptions where users can either define or redefine previously configured queries. The framework then identifies appropriate query parameters and executes the query. These parameters can correspond to a tuple of business object attribute and its attribute value. In some circumstances, query execution is done separately for the different business object types that occur in the query parameter list (asynchronous/ parallel execution is possible). During this execution, the index can be utilized to identify relationship graphs, which contain instances of a certain object types matching the defined query parameters. The results of the execution may be different sets of relationship graphs (such as one set for each involved business object type). The framework then determines the intersecting set regarding the relationship graph references. The intersecting set is a set of references to graphs (subset of result), which meet the query criteria. Thus the intersecting set is the query result. The corresponding graphs represent the various business processes that produced the requested business object relationships. The framework can be configured to display the result set. These display methods can interactively explore the business object relationships and to drill down into single involved business objects. The framework may also export the relationship graphs representing the query results to an appropriate format for later offline analysis.

In another example of framework functionality, application specific functions are integrated for the determination of the semantic and the direction of a relation. Such semantic information helps provide the metadata on the relationships, which allows for more flexibility in gathering relevant information. For example, case manager 134 could i) grab nodes that involve a particular business process step; ii) grab nodes that go a certain direction from the target node; iii) determine that the conditions for buying something were changed, which violated certain rules; and so on using this semantic information. Example, semantic information may include: i) direction of relation; ii) business process step that created it; iii) protocol (remote call, local call, etc.); iv) time of creation; v) duration of creation time; vi) conditions met or required for that relationship to exist; as well as others. To accomplish this, case manager 134 may include or implement a standard semantic interface that grabs a set of semantic information. There can be add-on interfaces that allow a developer using development environment 130 to grab other semantic information (typically application-specific). Once this information is gathered it could then applied to the edge between the edges.

In yet another example, the framework 334*b* provides sophisticated layout algorithms, which can be used in order to format the calculated graph structure in a convenient way (perhaps depending on user objectives). During the layout calculation, the framework can implement user-specified criteria (e.g. which node is in the center, color of nodes and edges, and ordering of neighbored documents). These criteria are retrieved from a customizing component which is part of the framework (such as customizing UI, customizing persistency layer, set of interfaces). Moreover, the framework provides a set of efficient graph algorithms that support the analysis of the calculated graph structure (e.g. short-cut detection: technical objects are eliminated or collapsed in the visualization). Rules for applying certain algorithms on calculated graph structures can be freely defined and persisted in a central repository of the framework. For example, these algorithms could include graph clustering algorithms to discover where business objects are created/placed, as well as flow or weighted algorithms. Moreover, these algorithms can be automatically applied when the visualization is generated (e.g. remove/hide/prevent technical objects from visualization and show short-cuts instead).

In a further example, the framework 334*b* typically provides an interface to request the gathered information directly for further processing in an online scenario (such as visualization or analysis). The framework may also operate on a central instance in a system landscape. Additional systems can be incorporated into the discovery process by implementing a registration component (for systems) and appropriate interfaces which rely on well known network protocols. In this case the application dependent functions are remotely executed in order to collect information in the remote systems. During the discovery process the host system of a certain document is stored. Moreover, the framework provides an interface to retrieve the gathered information from the persistency layer for further processing in an offline scenario (such as visualization or analysis). The visualization component of the framework is often highly interactive. One main task is to visualize the calculated graph structure and to provide mechanisms for a drill-down to the related business objects 142 and their relations to provide information about the corresponding objects and steps in the business processes. The framework provides mechanisms to expand and collapse certain regions of the graph structure in order to focus on relevant business objects or relations. When a calculated graph structure is visualized, the framework pays attention to user defined criteria that describe domains of interest for a user or group of users (document types, types of relations, etc.). These criteria are retrieved from the mentioned customization component. The corresponding parts of the graph can be expanded in the visualization, while all the other parts are collapsed. The user can interactively expand/collapse region of interest in the graphical representation of the graph. Additionally, the user can drill-down to a representation of a certain business object 142 or relation by clicking on the corresponding graph element. In this case, an appropriate application can be started which is integrated into the framework by the use of open interfaces and a registry mechanism.

Figure 7A:
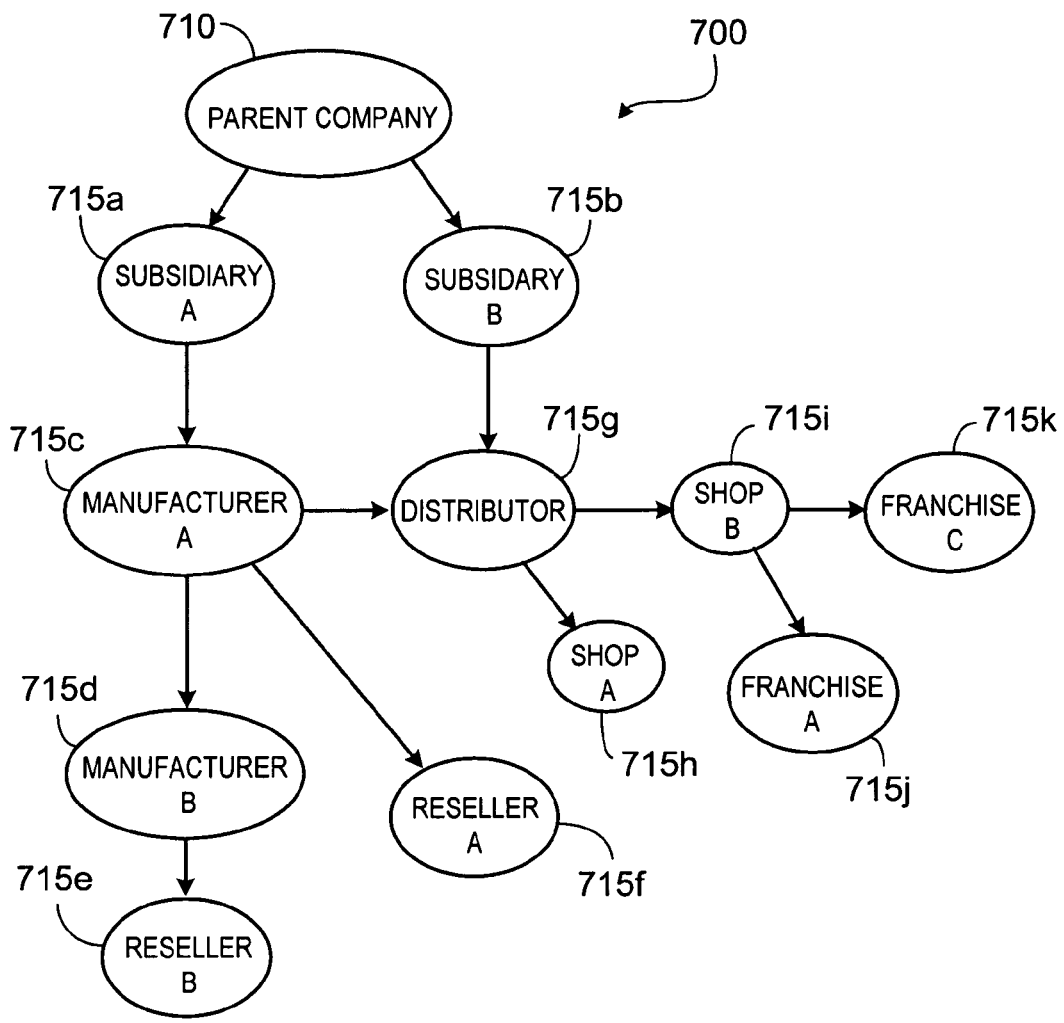

For example, this framework 334*b* can more easily discover related objects and present them in a hierarchical view. FIGS. 7A-C illustrate such a relationship 700 (prima nota 710 and child objects 715) and example views of various relationships. The sales order 0000000064 is linked to the outbound delivery 0080000060. This outbound delivery is linked to the customer individual billing document 0090000035 which in turn is linked to the accounting document 001 0090000035 2001. Such hierarchical views (or the information therein) may have been generated, requested, or retrieved by APIs. For example, FIG. 9 represents a graphical view of a table with registered application specific callback functions for the framework. The framework calls these functions in order to identify relationships of documents of the corresponding business object type (sales order, accounting, etc.) to a specific business object. For example, relationships can be discovered between business object sales order 0000000064 and any other type of business object. In order to do this, the framework may call registered callback function with the input parameter 'sales order 0000000064.' In this example, the functions determine related objects to the input object and return a list with object identifiers to the framework and the framework adds the discovered object identifiers to a stack for further processing and adds the corresponding edges and nodes to the relationship graph. In the example the callback function ASH_SD_VBAK_RELATIONS_GET determines the relationship between the sales order and the outbound delivery. This process is recursively applied to all the object identifiers on the stack until the stack is empty.

Case manager 134 may also offer an archiving module 336. At a high level, the archiving module 336 can build or use a central index by using the information stored in the central repository for status and meta-information). The connected archives and backup stores are scanned by the framework and the index is built according to the rules stored in the rules repository by extracting the relevant data from the archives/backups. In this approach, connectors for various archiving/ backup systems are integrated into a framework (or usable by the framework). The framework helps define a generic interface for an archive and a backup connector. This interface contains methods for the sequential scanning of archives/backups (iterator over records in archive or backup files), the data extraction from archives/backups and publishing the record structure of data items in the archive/backup store. Vendors of archiving and backup systems or other software companies can provide a connector to archive or backup system by implementing the corresponding methods of the interface and registering the connector in the framework.

In the distributed instance, the built indices are decentralized (e.g. for each of the connected archives/backups systems). The framework defines a common indexing infrastructure where indexing jobs are executed in parallel (distributed execution) and translated indexing tasks the different indexing sub-systems. Once archive files and older backups are indexed, the framework can monitor current archiving and backup processes. Generally, this can mean that the indexes are updated/extended after new archiving/backup runs are executed. Indeed, if archives are stored locally on employee client 104, then an agent on the machine may be placed to communicate this archive like information from the employee's client 104 to this central index.

It will be understood that FIG. 3 is merely an example configuration of one software solution that offers select functionality of the described case manager 134. In other words, none, some, all, or other modules—whether local or remote or whether third party or not—may be used so long as the appropriate functionality is implemented or achieved. Accordingly, regardless of the particular hardware or software architecture used, environment 100 is generally capable of managing information retention and collection in a litigation context and facilitating litigation document processes and techniques. The following descriptions of the flowcharts focus on the operation of case manager 134 in performing the respective method. But system 100 contemplates using any appropriate combination and arrangement of logical elements implementing some or all of the described functionality. For example, some of the processing or other techniques may be implemented by business application 130 or information retention manager 136 (or some other invoked or referenced libraries or sub-modules not illustrated) working in conjunction with case manager 134.

Figure 10:
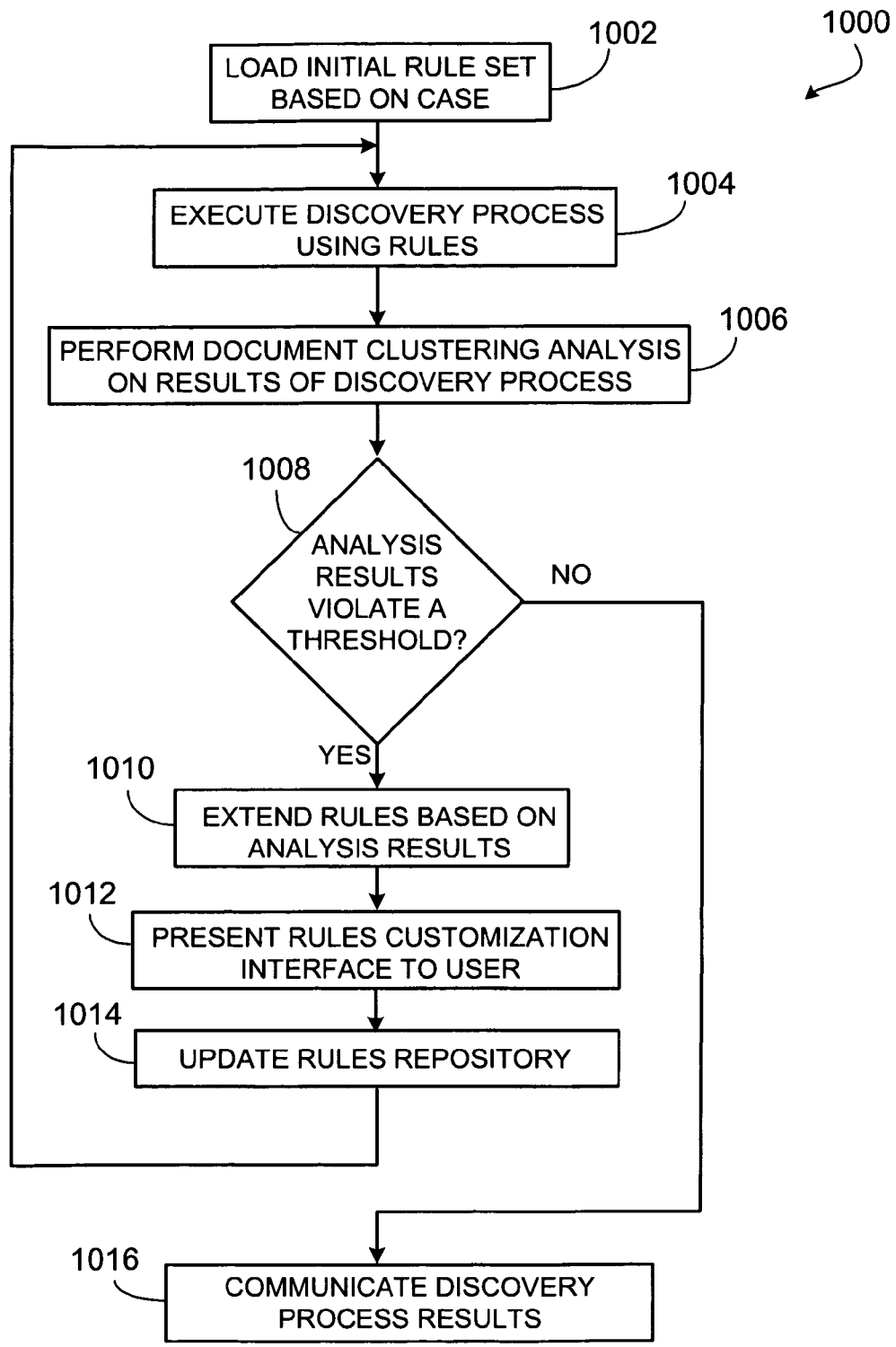
FIG. 10 illustrates an example flowchart depicting a discovery process using an adaptable ruleset within a particular implementation of the present disclosure.

FIG. 10 illustrates an example flowchart depicting a discovery process 1000 using an adaptable ruleset within a particular implementation of the present disclosure. Generally, process 1000 involves executing a discovery process based on a ruleset 124 and enhancing or tailoring those rules 124 based on the results to improve the current or future results. Specifically, process 1000 begins at step 1002, where case manager 134 loads an initial ruleset 124, which comprises at least a subset of the rules 124 developed for electronic discovery. This identification of the initial ruleset may be based on any suitable criteria including the specific case, a case type, an effected department, and so on. These rules 124 can include the definition of document types and document locations, as well as the definition of characteristic/properties for relevant electronic documents in the context of the corresponding litigation. Moreover, as appropriate, this discovery process can be, include, or request process 1200 (described in more detail below) utilizing offline repository 123.

Next, at step 1004, case manager 134 executes a discovery process—perhaps automatically or in response to user input—using those loaded rules 124. This discovery process supports the discovery of various documents types (business objects, emails, PDF, and so on) in large scale distributed environments including backup stores, archives, databases, and other types of storage systems. In some implementations, these rules 124 can be defined in the context of certain litigations (according to law, company rules, and so on) or based on overall regulations and guidelines. Once a relevant electronic document is identified, a reference to the document and a reference to the matching rule/criteria in the rule repository 124 might be linked to the corresponding legal hold case. This can help identify the reason for a legal hold placed on a certain document. Regardless, the electronic discovery process can be executed as a number of parallel background jobs, which can be monitored (progress monitoring). In other words, the electronic legal discovery process typically acts autonomously once executed.

Case manager 134 can then perform document clustering analysis, using any suitable algorithm (such as hierarchical or partitional), on the results of the discovery process at step 1006 to help determine some statistics or metrics associated with the results. For example, these statistics may include keyword frequency (calculate the number of hits per document and provide a hit list results) and identified topics or domains of the results (determine whether to automatically exclude business classifications or if others are missing). Using this analysis, case manager 134 can determine whether the results violate some dynamic or static threshold of accuracy or completeness as show at decisional step 1008. If the results violate one of the thresholds, then case manager 134 may extend or enhance the appropriate rules 124 at step 1010. This extension or enhancement may be automatically performed, manually guided via GUI 116, or some combination thereof. For example, case manager 134 may automatically identify an error in one of the rules 124 and, at step 1012, present a proposed change to an appropriate user via GUI 116. Then, if the rules are updated in some fashion, the rules repository is updated at step 1014 and the discovery process is (partially or fully) rerun at step 1004. Once the results satisfy a certain number (or all) of the thresholds at decisional step 1008, then case manager 134 often communicates these results at step 1016. For example, these results may be communicated to the legal framework, a document collection repository or application, the information retention manager 136, GUI 116, or any other suitable recipient. In another example, the electronic discovery process can be executed asynchronously in the background such that the user can operate on intermediate results (review documents, copy documents, etc.) of the electronic discovery process. Once results are capable of being presented to GUI 116, the user can directly navigate to discovered documents from the particular case. This navigation often occurs by double-clicking on a particular discovered document reference, which can kick off the appropriate software (perhaps according to document type) that displays the document content.

Figure 11:
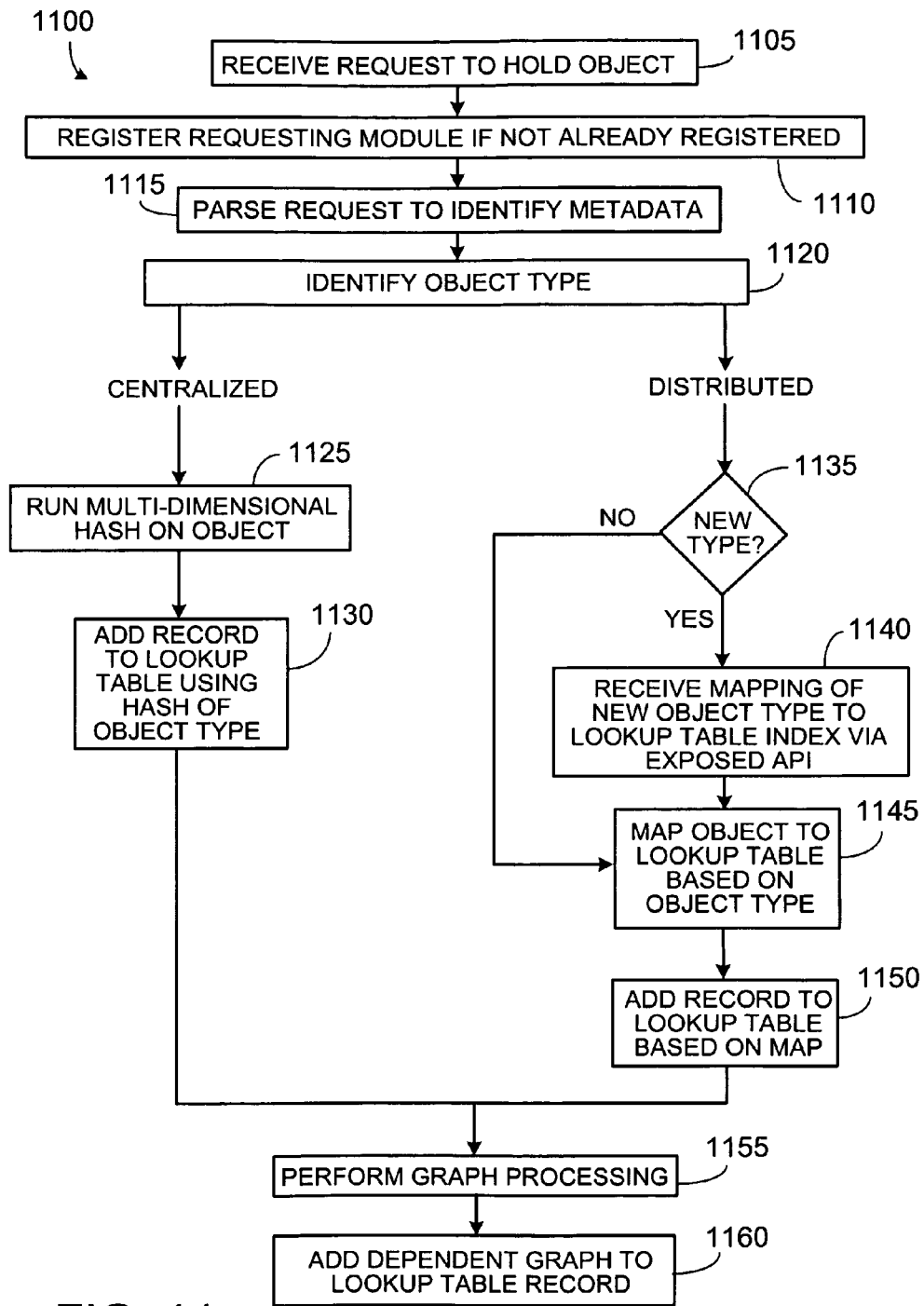
FIG. 11 illustrates an example flowchart depicting a process for applying a legal hold to an active object within a particular implementation of the present disclosure.

FIG. 11 illustrates an example flowchart depicting a process 1100 for applying a legal hold to an active object within a particular implementation of the present disclosure. In this process, a record (or other indicator) is recorded by case manager 134 in a (logically) centralized or distributed lookup table 122 (or other similar data structure) to reflect a legal hold requested on an associated data item. Specifically, a legal hold request is received at step 1105 in the illustrated step 1105.

In certain situations, the requesting software module may be registered with case manager 134 at step 1110. For example, case manager 134 may maintain a list of registered modules so that it may broadcast to these modules (or otherwise notify) when one or more legal holds is released. In another example, case manager 134 may add an identifier of the requesting module to the respective lookup table 122. In this example, case manager 134 would specifically notify the particular module when that lookup record is removed. At step 1115, case manager 134 can parse the request to identify metadata. Using some of this parsed metadata, case manager 134 may identify the object type (such as business object type, archive type, source code, etc.) at step 1120. This object type may be used to determine a specific lookup table 122 in certain situations. For example, a logically centralized lookup table 122 may be used for active business objects, regardless of location, while distributed lookup tables 122 may be used for archives and source code. In another example, a centralized table 122 may be used for all legal hold objects regardless of type.

If the lookup table is centralized (at least for this object or object type), then case manager 134 runs a multidimensional hash on the particular hash at step 1125. This hash could use various data from the object instance, the requesting module, and so forth. Typically using this hash as an efficient primary key, case manager 134 then adds the relevant record to lookup table 122 at step 1130. If the lookup table is distributed (at least for this object or object type), then case manager 134 may determine if the object type is a new type as shown at decisional step 1135. If so, case manager 134 determines, receives, or otherwise identifies a mapping of the new object type to the particular lookup table 122, perhaps via an exposed API at step 1140. Once the map is known (the map is likely already known if a known object type), then case manager 134 maps the particular object to the lookup table 122 based on the object type at step 1145. Next, at step 1150, case manager 134 adds the relevant information to the lookup table 122.

Once the identified object (or, more specifically, some of its information) has been added to the table, then case manager 134 may perform graph processing on the object. In one implementation, case manager 134 may traverse known graphs to identify child objects that should be added to the lookup table (as shown at example step 1160) as they should not be deleted if the parent is still active. For example, a business object 142 may have one or more known attachments 144 that are important the object's understanding, particularly in view of a legal hold. In another example, a to-be-held source code file may have a number of associated header files that should also be held. In yet another example, an archived object may be intimately related with other archived objects in the same or different archives. In this instance, the information pertaining to the various objects may be stored in the same centralized table as other objects, a table designated for archived objects, or different tables associated with the archived objects' locations. In another implementation, case manager 134 may intelligently create and persist a graph of such relationships and add the graph to the lookup table 122, perhaps using a pointer—stored in the requested object record—to the persisted graph.

Figure 12:
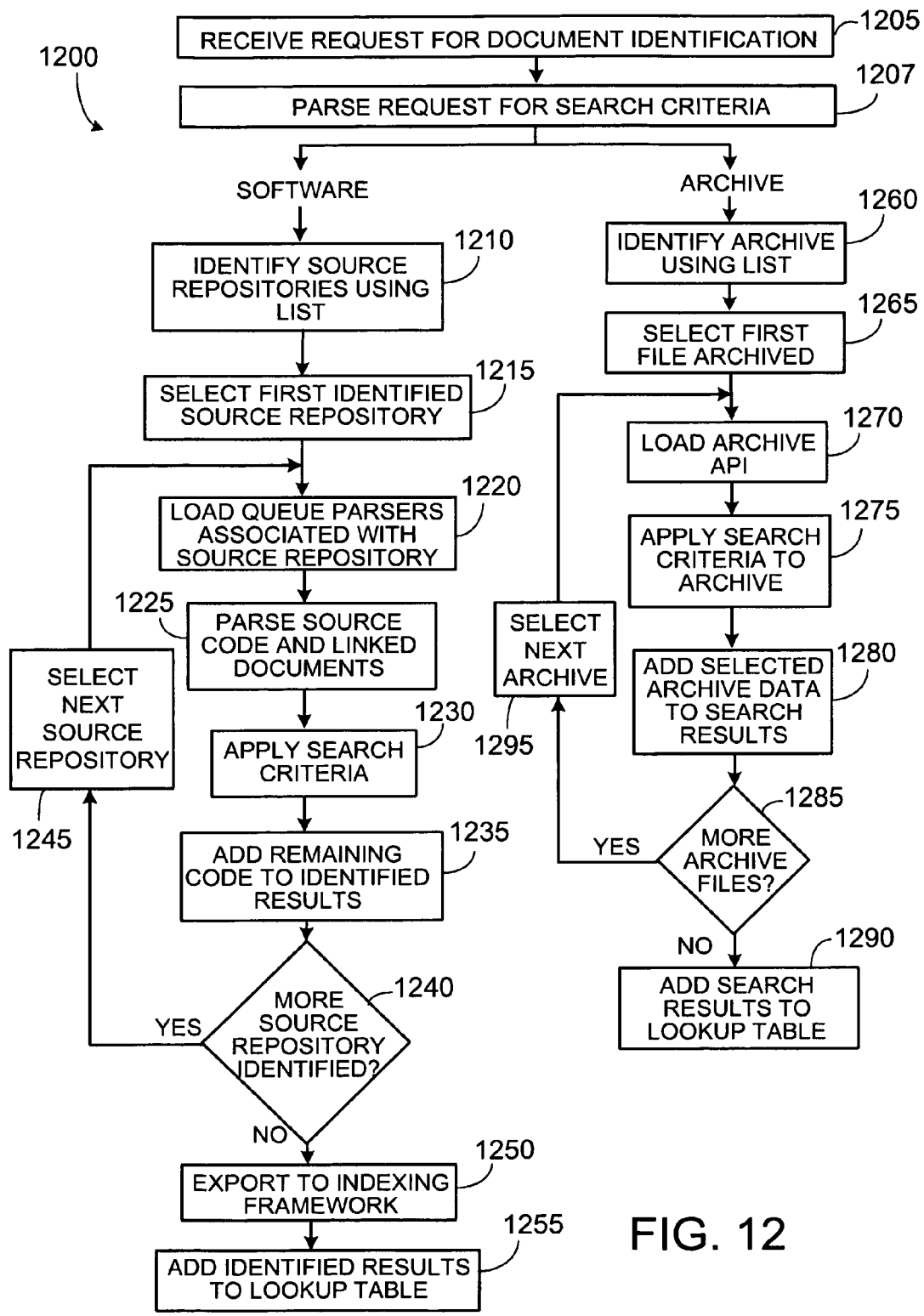
FIG. 12 illustrates an example flowchart depicting a process for applying a legal hold to inactive information, such as source code and archived data, within a particular implementation of the present disclosure.

FIG. 12 illustrates an example flowchart depicting a process 1200 for applying a legal hold to inactive information, such as source code and archived data, within a particular implementation of the present disclosure. Generally, inactive information (including information that never was or might once have been active) may be stored in various repositories. For example, different development groups may use different source control systems. In another example, different archive repositories may be used based on object types, temporal nature of activity, logical or physical location, and so forth. Regardless of the number or location, case manager 134 is generally capable of reading, parsing, loading, managing, or otherwise communicating with these various repositories to enforce or implement legal holds or document collection.

In one embodiment, case manager 134 receives a request for document identification or collection at step 1205. Next, at step 1207, case manager 134 parses this request to identify search criteria. For example, this parsing may include identification of the actual parameters (keywords, time frame, object type, etc.), specific repository, client or personalization data, and so forth. Then, using this information, case manager 134 can search the relevant repositories.

For example, case manager 134 may identify one or more relevant source code repositories (or control systems), often using a source repository list (or index or other suitable data structure), as shown at step 1210. This list may be of any suitable format and include any appropriate information such as physical or logical address, location or access point for the APIs or connectors, description, source code type, and others. In some instances, case manager 134 loads a sub-module that supports the discovery of information related to intellectual properties contained in source code and the corresponding documentation. This source code discovery framework cooperates with various source code repositories of different vendors. Generally, the discovery process can be independent of the underlying programming language (e.g. C, ABAP, java, and so on). The case manager 134 then selects the first identified source repository at step 1215. Once identified, the case manager retrieves, loads, or invokes connectors to this repository. In some cases, software connectors to the source code repositories are provided and integrated into the source code discovery framework. Similarly, case manager 134 may integrate open interfaces new source code parsers or language specific parsers that have knowledge about the way comments are integrated into the source code and how documentation is linked, as shown at step 1220. This allows case manager 134 to be extendable to new source control system or programming languages.

Once the case manager 134 loads the various APIs, it parses source code and linked documentation source (e.g. java-doc, ABAP Function Module Documentation) according to the selections at step 1225 and applies predefined filter criteria (e.g. comment lines, module names) at step 1230. The results are then added to the runtime results at step 1235. If there are more identified source repositories (as shown at decisional step 1240), the case manager selects or identifies the next repository at step 1245 and processing returns to step 1220 using this next repository. The output of the parser from the various repositories can be exported to an indexing framework in order to build a full text search infrastructure at step 1250. At step 1255, these results are then added to the appropriate lookup table 122. In some implementations with discovered or identified source code modules, new versions (or instances) are created and the old versions are frozen (no modifications are allowed). Links to the frozen versions are part of the result of the discovery process and can be stored in a central discovery repository for later evaluation/usage. Ongoing development is then based on the new versions of the software modules.

If desired information resides, might reside, or is expected to reside in archives, then case manager 134 processes the one or more relevant repositories. For example, case manager 134 may identify one or more relevant archive repositories often using a source repository list (or index or other suitable data structure), as shown at step 1260. This list may be of any suitable format and include any appropriate information such as physical or logical address, location or access point for the APIs or connectors, description, information type, and others. For example, a central index may store unique identifiers for archives/backups and their locations. Meta-information about the location of an archive file, the creation date, the utilized archiving/backup system (vendor) and the record types (structure description of a data object) contained in archive files may also be maintained. Based on this information, the framework is able to locate the archive files and backup systems in the network (distributed environment). Additionally the structure of data objects that are contained in archive files and backup stores is normally known.

In one embodiment, this portion of the process can utilize a central framework for an electronic discovery of various document types in decentralized and heterogeneous system landscapes where different archiving systems and backup stores are used. The indexing subsystem provides the functionality to build indexes according to rules which specify the documents relevant for the discovery process in the context in different legal actions. These indexes consider data from old archives and backup stores (offline indexing) as well as data which just has being moved into the archive/backup store. This helps accelerate the electronic discovery and make it easier to use due to one central entry point for the discovery process. Accordingly, case manager 134 may more easily locate archive files and backup stores in the distributed heterogeneous environment, lookup relevant data in distributed archive files and backup stores produced by archiving and backup systems of various vendors, and enforce a legal hold for archived data in the distributed environment (prevent relevant archived data from being destroyed).

Turning to the illustrated example, the case manager 134 then selects or identifies the first identified archive repository at step 1265. Once identified, the case manager retrieves, loads, or invokes APIs to this repository at step 1270. In some cases, case manager 134 defines a generic interface for an archive and a backup connector. This interface can contain methods for the sequential scanning of archives/backups (iterator over records in archive or backup files), the data extraction from archives/backups, and publishing the record structure of data items in the archive/backup store. In other cases, vendors of archiving and backup systems or other software companies can provide a connector to the archive or backup system by implementing the corresponding methods of the interface and registering the connector in case manager 134's framework.

Once the case manager 134 applies predefined filter or search criteria (e.g. comment lines, module names) at step 1275. The results are then added to the runtime results at step 1280. If there are more identified archive or backup repositories (as shown at decisional step 1285), the case manager 134 selects or identifies the next repository at step 1295 and processing returns to step 1270 using this next repository. The output of the parser from the various repositories can be exported to an indexing framework in order to build a full text search infrastructure at step 1250. These results are then added to the appropriate lookup table 122 at step 1290.

Figure 13:
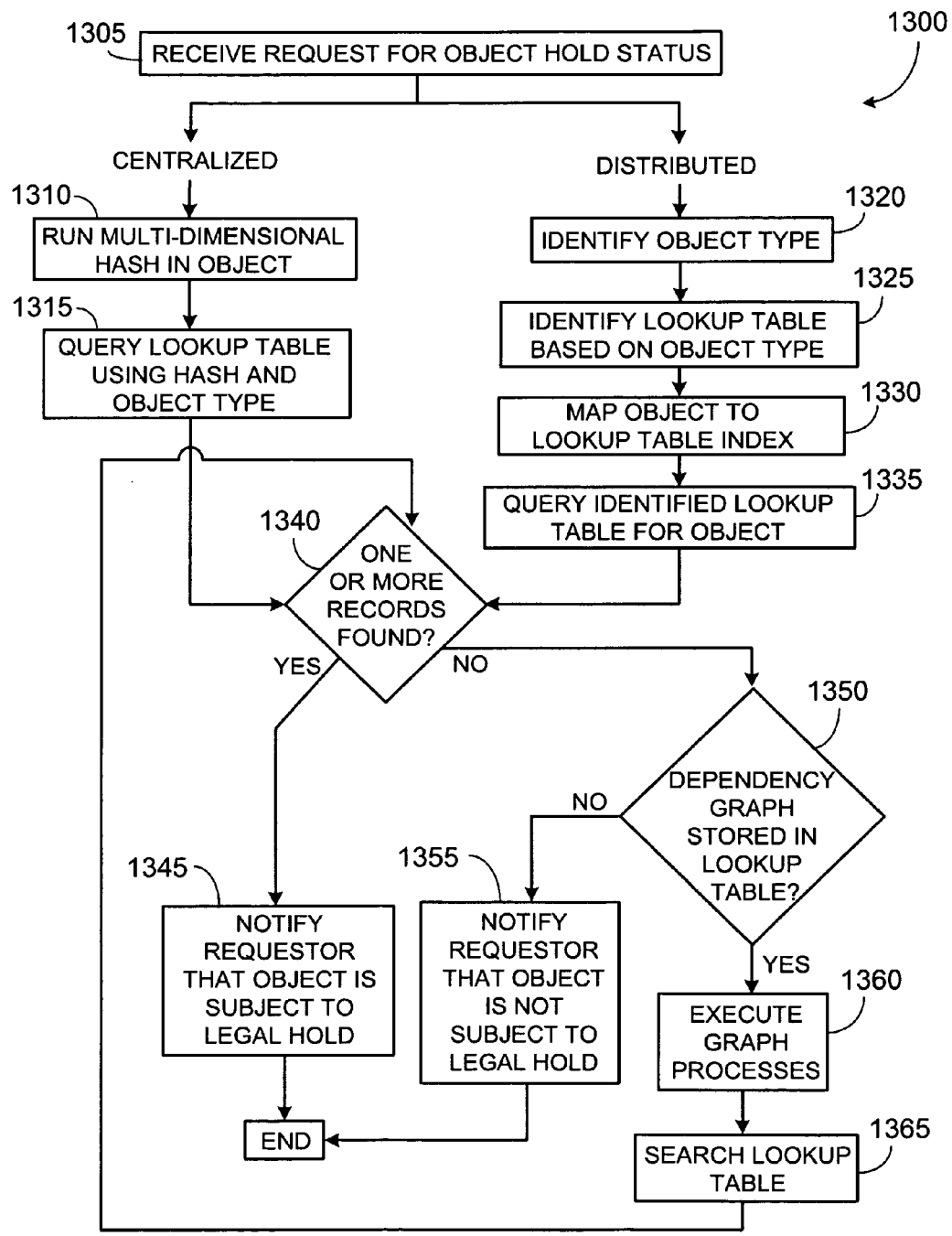
FIG. 13 illustrates an example flowchart depicting an efficient process for determining whether an object is subject to a legal hold within a particular implementation of the present disclosure.

FIG. 13 illustrates an example flowchart depicting an efficient process 1300 for determining whether an object is subject to a legal hold within a particular implementation of the present disclosure. Specifically, case manager 134 may receive a request for an object's hold status at step 1305. This request may come from any suitable module or user, including the front-end of case manager 134, business application 132, information retention manager 136, development application 130, and others.

If the lookup table 122 is centralized (at least for this type of object), then case manager 134 executes or runs a multidimensional hash on the object at step 1310. Using this hash, and perhaps the object type, case manager 134 queries the lookup table 122 at step 1315. If the lookup table 122 is distributed, then case manager 134 may identify the object type 1320 to identify the appropriate lookup table 122 at step 1325. Next, at step 1330, case manager 134 maps the object to the lookup table index. The case manager 134 then queries that lookup table 122 for the respective object at step 1335.

If the case manager 134 locates one or more records in the particular lookup table 122 at decisional step 1340, then it notifies the requester that the object is subject to one or more legal holds. For example, this notification may merely comprise a binary status (such as "free" or "held") or may instead include more detailed information such as the specific case or cases, the length of the hold, the type of hold, the registered module, child objects, and so forth. But if no record was found, then the case manager 134—in situations where the dependency graph is not part of the table (decisional step 1350)—notifies the requestor that the particular does not appear to be subject to a legal hold at step 1355. If object relationship graphs are stored in or utilized by the lookup table 122, then case manager 134 may execute various graph processes at step 1360 to determine if the object is subject to a legal hold, such as via its prima nota, at step 1365. If this graph processing occurs, then case manager 134 may return to decisional step 1340 as appropriate.

Figure 14:
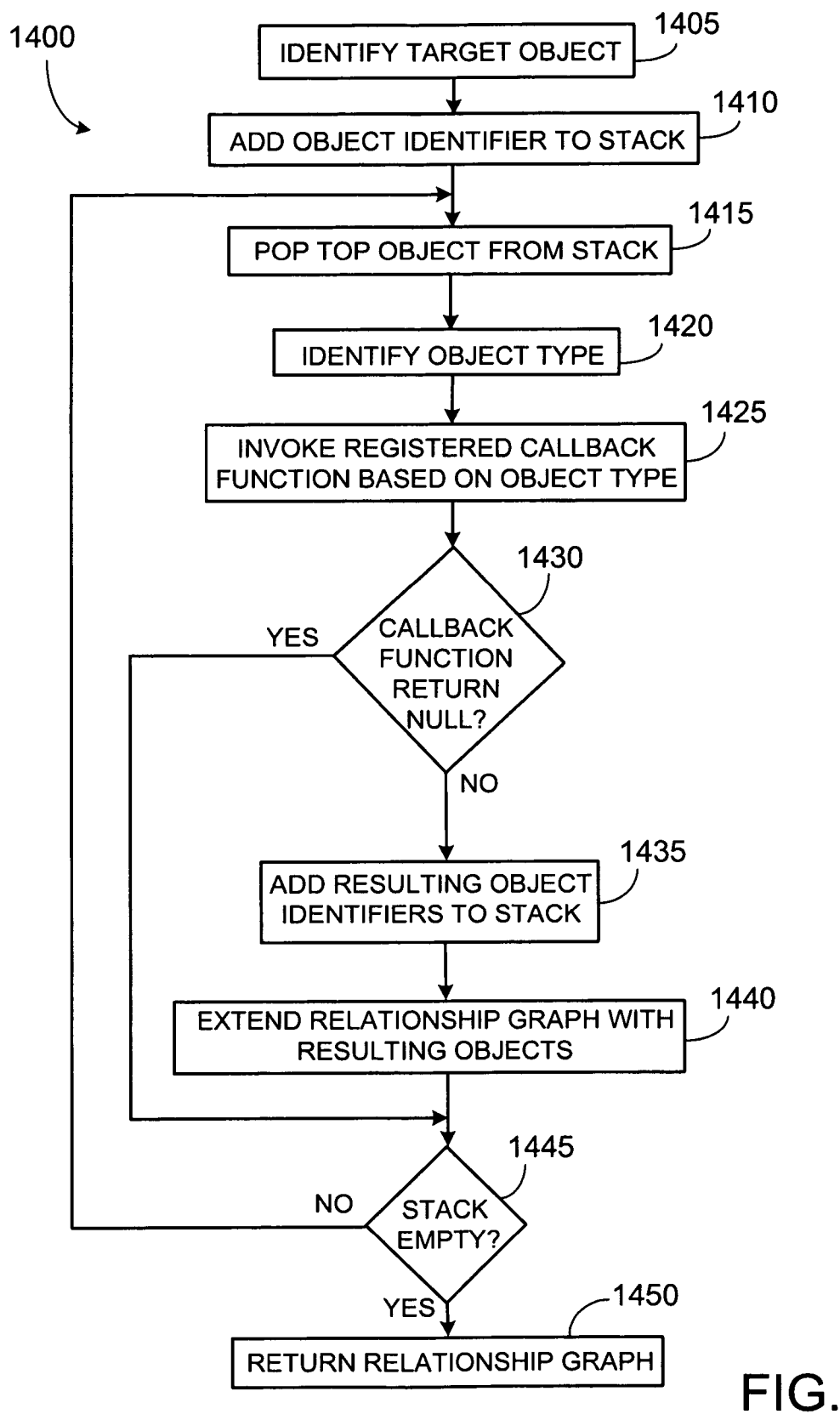
FIG. 14 illustrates an example flowchart depicting a process for generating a business object relationship graph within a particular implementation of the present disclosure.

FIG. 14 illustrates an example flowchart depicting a process 1400 for generating an object relationship graph within a particular implementation of the present disclosure, such as that potentially utilized in earlier processes. Specifically, example process 1400 first identifies the target object at step 1405. For example, case manager 134 may be adding a particular target object to a lookup table 122 or may be quickly determining if the target object is (either directly or indirectly) subject to a legal hold.

In this illustrated flowchart, the case manager 134 adds the object identifier to a stack at step 1410 and then immediately pops it off the stack at step 1415. The case manager 134 identifies the object type at step 1425 and invokes registered callback functions (such as those illustrated in FIG. 9) based on the object type at step 1425. In some circumstances, the case manager 134 may immediately invoke the registered callback function if the object identifier and object type are already known instead of adding the target object to the stack. If the function does not return null, then the resulting object identifiers are added to the stack at step 1435. Next, case manager 134 extends the particular relationship graph with the resulting objects at step 1445. If the stack is not empty at decisional step 1445, then processing returns to step 1405. Otherwise, this particular graph is completed and can be returned to the requestor or otherwise utilized as appropriate at step 1450.

The foregoing process can be implemented by the following example algorithm:

Input: Object-ID of object for which relationships are to be discovered
(perhaps Object-type and Object-Key as well)
ADD input object ID to stack
WHILE stack is not empty.
    NextObject = get top element of stack.
    FOR all registered callback functions.
        RelatedObjects = callback(NextObject).
        ADD all objects from RelatedObjects to stack.
        EXTEND relationship graph by RelatedObjects.
    END FOR.
END WHILE.
DISPLAY relationship graph (or EXPORT)

Additional callback functions can be defined where those functions determine directions for the relationships (e.g. based on timestamps), as well as callback functions that provide additional semantic information. These callback functions can be easily integrated into the above described algorithm as additional FOR loops. In some implementations, the input to these callback functions can be tuples that describe a relationship between a pair of business objects (e.g. sales order ID, outbound delivery ID).

Figure 15:
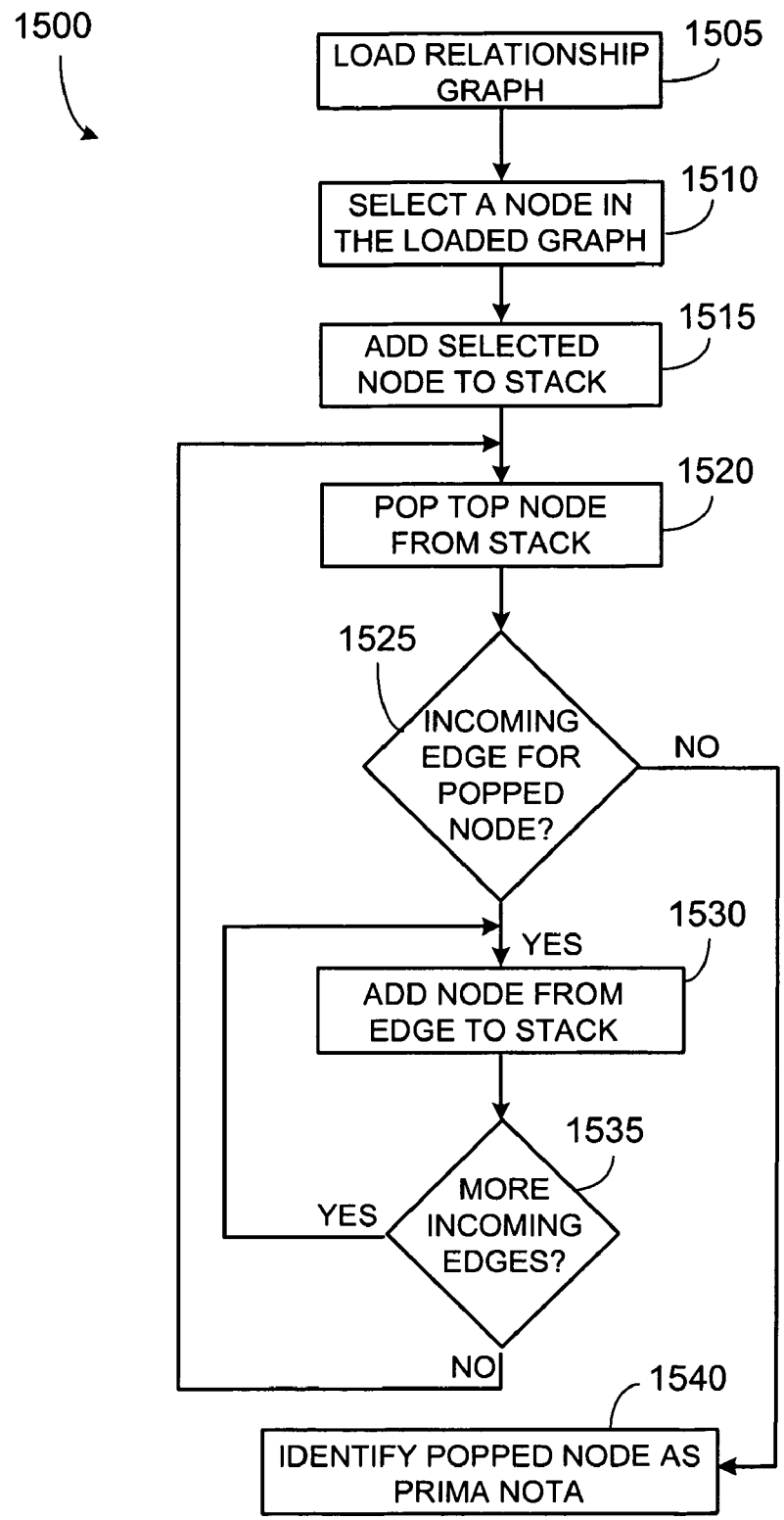
FIG. 15 illustrates an example flowchart depicting a process for identifying a prima nota within a particular implementation of the present disclosure.

FIG. 15 illustrates an example flowchart depicting a process 1500 for identifying a prima nota within a particular implementation of the present disclosure. Generally, "prima nota" is a term from accounting meaning "original document" or "originating document". Accordingly, identifying a prima nota in this context generally involves a graph structure with directions (directed graph) to find the source data, typically business subject 142. Generally, this process 1500 outputs the business object (or document) ID. For example, this could be used to save storage in the lookup table by merely storing the prima nota ID and the graph. Then, when one of the child nodes (objects) is to be deleted, case manager 134 can find the "prima nota," search the lookup table for this prima nota, and (if found) determine that the child should not be deleted because of the hold on the prima nota.

More specifically, illustrated process 1500 loads a particular relationship graph at step 1505. Then, at step 1510, case manager 134 selects any node within the loaded graph. This selected node is then added to a stack at step 1515. At step 1520, case manager 134 pops the top node from the stack. It then determines at decisional step 1525 if there is an incoming edge for that popped node. If there is, the other node along the edge is added to the stack at step 1530. This processing continues for the popped node so long as there are additional edges at decisional step 1535. Once there are no more additional edges for the popped node, then processing returns to step 1520. Once the stack is empty, then the popped node is the prima nota.

The foregoing process can be implemented by the following example algorithm:

```
Input: Graph G=(V,E), where V represents the set of graph nodes and
E is the set of directed edges of the graph. In the remainder we use
the notion (X,Y) for a directed edge pointing from node X to Y.
Output: Unique ID of a document that is the prima nota for the given
set of documents.
Select an arbitrary node A of the input graph. G=(V,E)
Insert A into empty set CANDIDATES.
    while CANDIDATES is not empty
        Select arbitrary node A from set CANDIDATES.
        for each incoming edge (X,A) of node A do
            if X has no incoming edge: X is prima nota
-> goto END: terminate with output ID(X).
                else if node X has an incoming edge (B,X) then
insert B into set CANDIDATES.
        end for.
        remove A from CANDIDATES.
    end while
    END
```

The described algorithm can be directly integrated into the framework for identification of linked objects in a distributed environment. Thus, the prima nota finding could be automatically applied once object relations are discovered.

The preceding figure and accompanying description illustrate processes and implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. For example, the collection, legal hold application, and relationship determination may all occur within the same logical process at substantially the same time. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. Software for managing legal holds on objects, the software comprising computer readable instructions embodied on non-transitory tangible media and operable to:
   identify a target object to associate with a particular legal hold;
   determine a hash value using data associated with the target object;
   determine a primary key for the target object using the hash value, the primary key comprising a unique identifier for the target object in a centralized lookup table, the centralized lookup table comprising a plurality of hold records for objects of different types;
   automatically communicate with the centralized lookup table using the primary key for the target object to verify a hold record associated with the target object;
   identify an additional target object to associate with the particular legal hold, the additional target object having a different type than the target object;
   automatically communicate with a decentralized lookup table to verify an additional hold record associated with the additional target object, the decentralized lookup table comprising a first lookup table associated with a first object type and a second lookup table associated with a second object type and wherein verifying the additional hold record comprises: identifying an object type of the additional target object; and automatically communicating with the first lookup table or the second lookup table based on the identified object type.

2. The software of claim 1, wherein verifying the hold record comprises:
   verifying existence of the hold record; and
   if the hold record does not exist, creating the hold record associated with the target object.

3. The software of claim 1, the lookup table associated with a first object type and a second object type, the target object associated with the first object type.

4. The software of claim 1, the hold record associated with the target object via a parent object of the target object.

5. The software of claim 4, the hold record referencing a relationship graph indicating a relationship between the parent object and the target object.

6. The software of claim 1, the object comprising an active business object associated with a business application.

7. The software of claim 1, the target object identified by a request from a requesting module via an exposed framework application programming interface (API) and the software further operable to register the requesting module.

8. The software of claim 1 further operable to:
   determine a collision between the target object and another object of a different type than the target object having the hash value; and
   resolving the conflict induced by the collision.

9. Software for managing legal holds on objects, the software comprising computer readable instructions embodied on non-transitory tangible media and operable to:
   receive a legal hold status request for a target object associated with a business application;
   determine a hash value using data associated with the target object;
   determine a primary key for the target object using the hash value, the primary key comprising a unique identifier for the target object in a centralized lookup table, the centralized lookup table including a plurality of hold records for objects of different types;
   automatically communicate with the centralized lookup table using the primary key for the target object to determine a hold record identifying a legal hold associated with the target object; respond to the legal hold status request with a legal hold status based on the lookup table communication;
   identify an additional target object to associate with the particular legal hold, the additional target object having a different type than the target object;
   automatically communicate with a decentralized lookup table to verify an additional hold record associated with the additional target object, the decentralized lookup table comprising a first lookup table associated with a first object type and a second lookup table associated with a second object type and wherein verifying the additional hold record comprises: identifying an object type of the additional target object; and automatically communicating with the first lookup table or the second lookup table based on the identified object type.

10. The software of claim 9 further operable to prevent destruction of the target object based on the lookup table communication.

11. The software of claim 9 further operable to remove a legal hold on the target object by requesting deletion of the hold record from the legal hold table.

12. The software of claim 11, the target object associated with a registered application and the software further operable to automatically notify the registered application of the legal hold removal.

13. The software of claim 11, the legal hold on the target object comprising a legal hold on a parent object of the target object and wherein removing the legal hold on the target object comprises removing the legal hold on the parent object.

14. The software of claim 13, the parent object comprising a first object type and the target object comprising a second object type.

15. The software of claim 9, the object comprising an active business object associated with a business application.

16. The software of claim 15, the business application comprising a remote business application.

17. The software of claim 9, the target object identified by a request from a requesting module via an exposed framework application programming interface (API) and the software further operable to register the requesting module for subsequent notification if the target object is subject to a legal hold.

18. The software of claim 9 further operable to process a manual modification of the legal hold to the hold record.

19. The software of claim 9 further operable to:
   receive a second legal hold status request for a second target object;
   automatically communicate with the lookup table to determine a second hold record identifying a legal hold associated with the second target object; and
   respond to the second legal hold status request with a second legal hold status based on the particular lookup table communication.

20. The software of claim 19, the second target object associated with a second business application.

21. The software of claim 19, the target object associated with a first object type and the second target object associated with a second object type.

* * * * *